United States Patent [19]

Ihara et al.

[11] Patent Number: 5,372,340
[45] Date of Patent: Dec. 13, 1994

[54] SPACECRAFT SYSTEM

[75] Inventors: Hirokazu Ihara, Machida; Masaya Yamamoto, Yokohama; Kouhei Kato, Fujisawa; Shigehiro Tomita; Masaharu Tadauchi, both of Yokohama, all of Japan

[73] Assignee: Hitachi, Ltd., Tokyo, Japan

[21] Appl. No.: 972,766

[22] Filed: Nov. 5, 1992

[30] Foreign Application Priority Data

Nov. 5, 1991 [JP] Japan ................ 3-288361

[51] Int. Cl.$^5$ ............. B64G 1/10; B64G 1/22
[52] U.S. Cl. ................ 244/161; 244/158 R; 244/159
[58] Field of Search ............ 244/158 R, 159, 161, 244/173, 164

[56] References Cited

U.S. PATENT DOCUMENTS

| | | | |
|---|---|---|---|
| 4,334,816 | 6/1982 | Slysh | 244/159 |
| 4,395,004 | 7/1983 | Ganssle et al. | 244/160 |
| 4,880,187 | 7/1989 | Rourke et al. | 244/158 R |
| 5,119,225 | 6/1992 | Grant et al. | 244/158 R |
| 5,145,130 | 9/1992 | Purves | 244/159 |
| 5,152,482 | 10/1992 | Perkins et al. | 244/158 R |

FOREIGN PATENT DOCUMENTS

| | | |
|---|---|---|
| 0196793 | 3/1986 | European Pat. Off. . |
| 56-99899 | 8/1981 | Japan . |
| 61-268599 | 11/1986 | Japan . |
| 240073 | 1/1990 | Japan .................... 244/161 |
| 2091194 | 1/1982 | United Kingdom . |

OTHER PUBLICATIONS

Transaction of the American Society of Mechanical Engineers Journal of Engineering for Industry-vol. 107, No. 1, Feb. 1985, NY "Satellite Servicing by Teloperator's".

Fujitsu-Scientific and Technical Journal, vol. 25, No. 1, 1989, Kawasaki JP pp. 1-24, Yamashita, T. et al. "Space Technology".

*Primary Examiner*—Michael S. Huppert
*Assistant Examiner*—Virna Lissi Ansley
*Attorney, Agent, or Firm*—Antonelli, Terry, Stout & Kraus

[57] ABSTRACT

A plurality of spacecrafts having their own functions are each provided with a communication controller and its own mission, and communicate with each other to perform specific operations. In addition, a plurality of units having particular functions are housed in a system dock, and arbitrary ones of these units are combined to constitute a spacecraft according to the use. Units responsible for performing the specific operations are interchangeably connected, so as to be separable from the individual spacecraft.

34 Claims, 21 Drawing Sheets

FIG. 3

| | EXTENSI-BILITY | MAINTAIN-ABILITY | OPERABILITY | | REALIZATION EXPECTANCY | |
|---|---|---|---|---|---|---|
| | | | EASINESS | DURABILITY | EASINESS OF CON-STRUCTION | TIME UP TO OPERATION |
| CONFIGURATION OF DIVISION-TYPE SPACECRAFT | ✗ | ✗ | ◯ | ✗ | ✗ | ✗ |
| CONFIGURATION OF DISPERSION-TYPE SPACECRAFT | ◯ | ◯ | ✗ | ◯ | ◯ | △ PARTIAL OP-ERATION CAN BE CARRIED OUT |

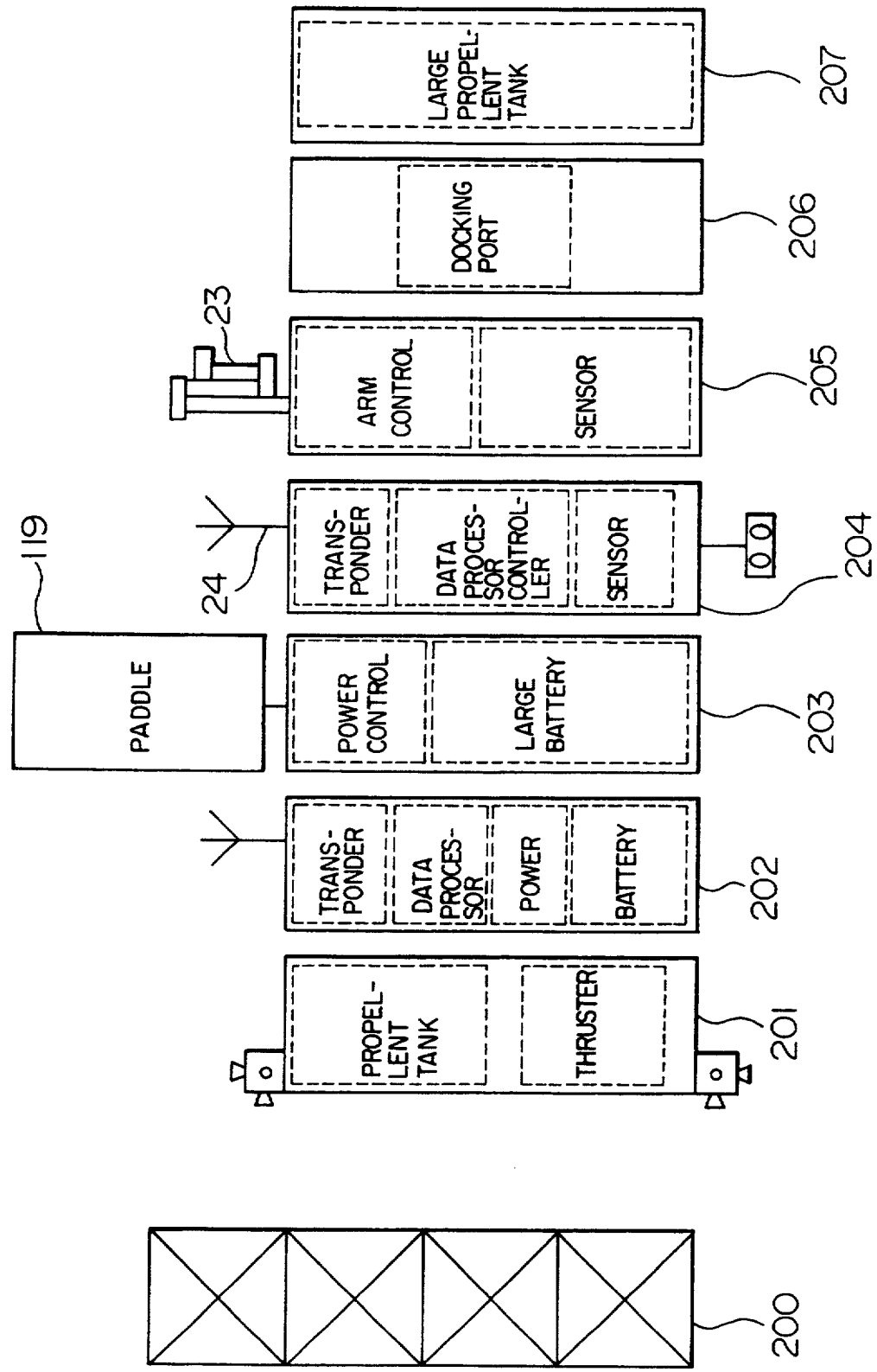

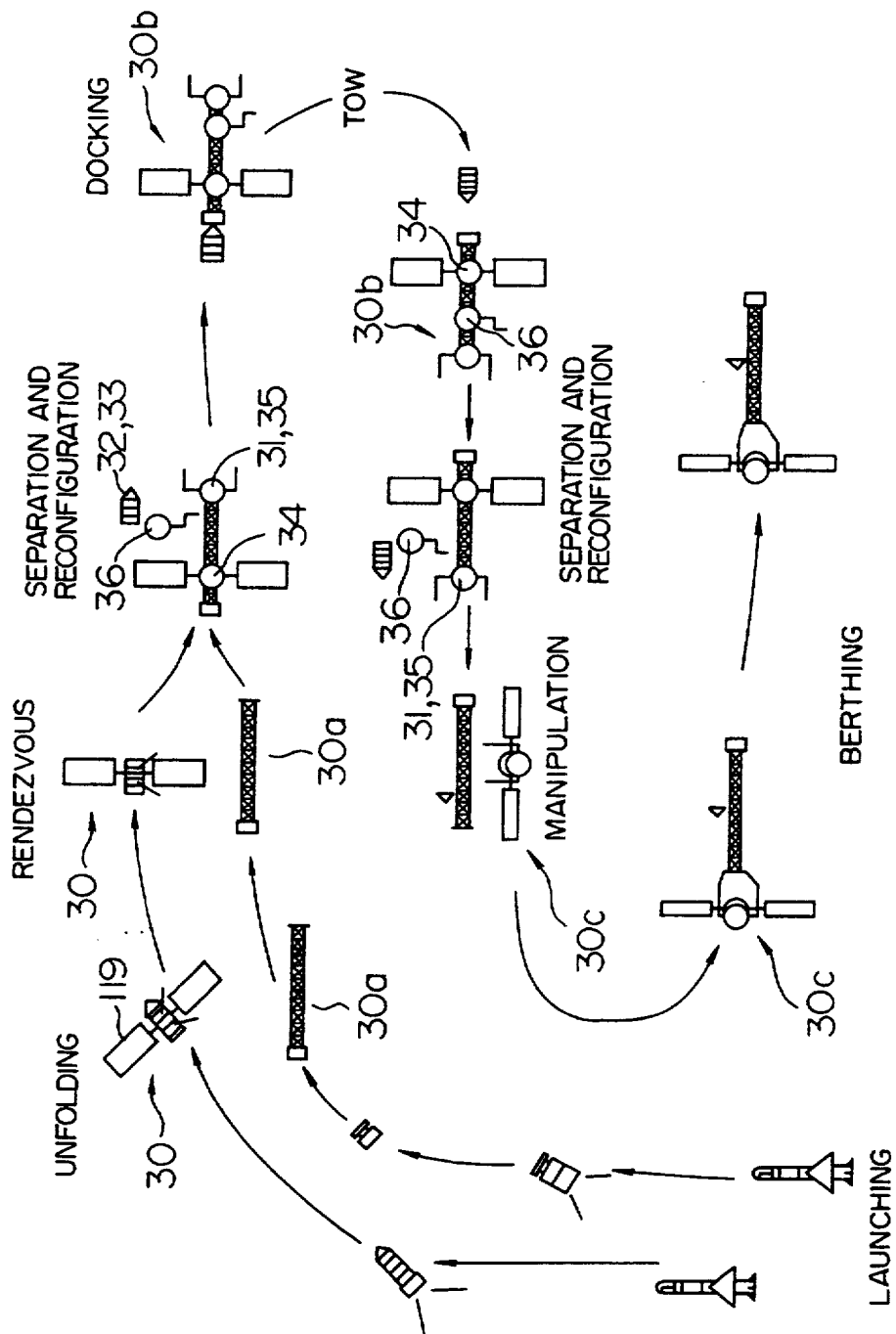

FIG. 23
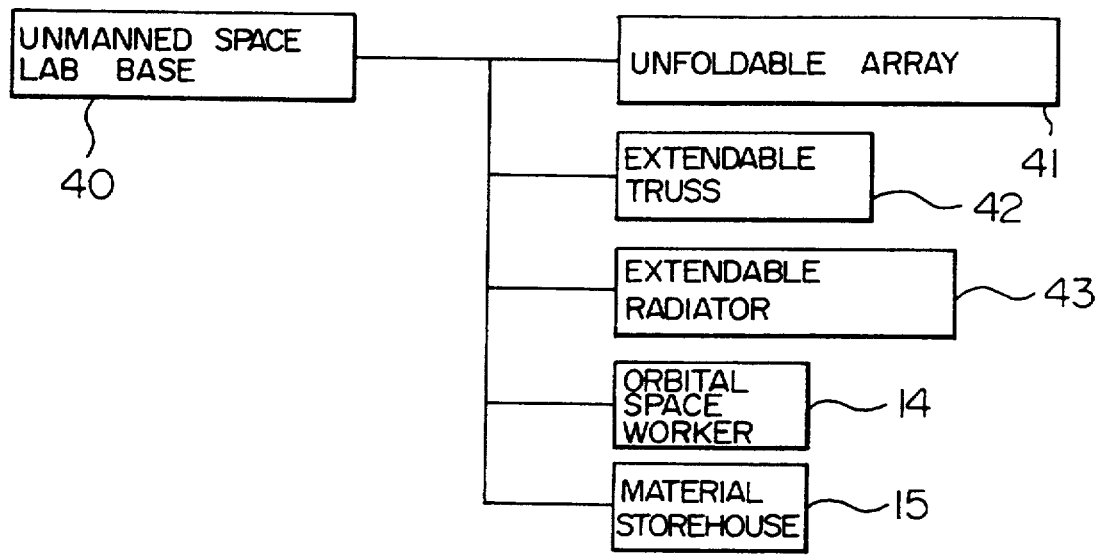
FIG. 24A
FIG. 24B
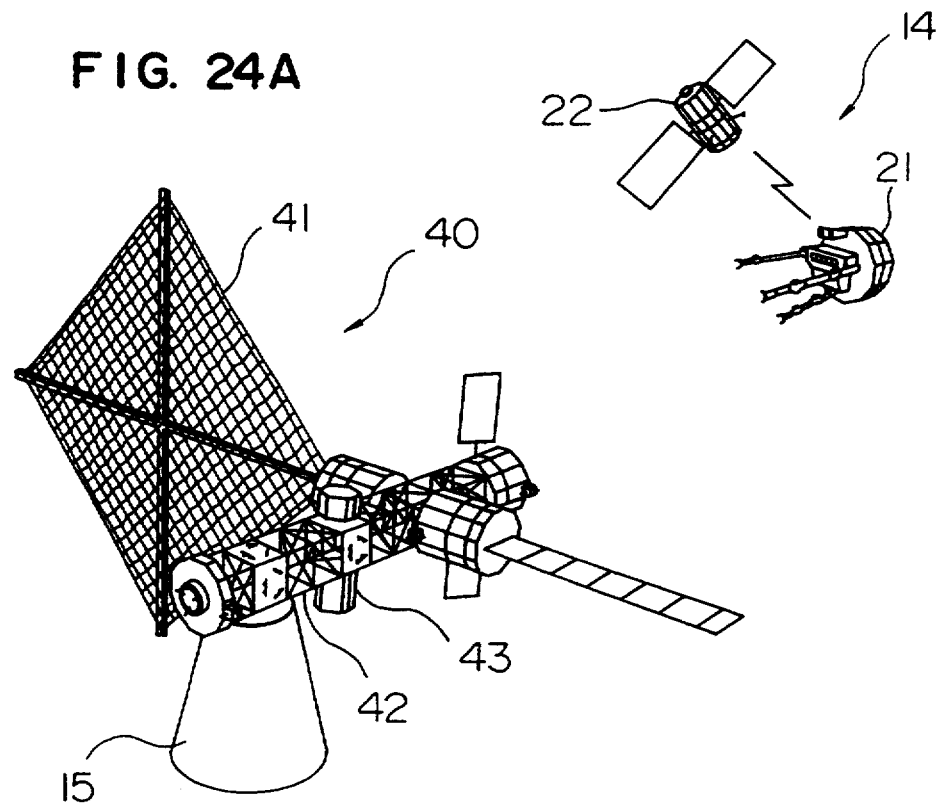

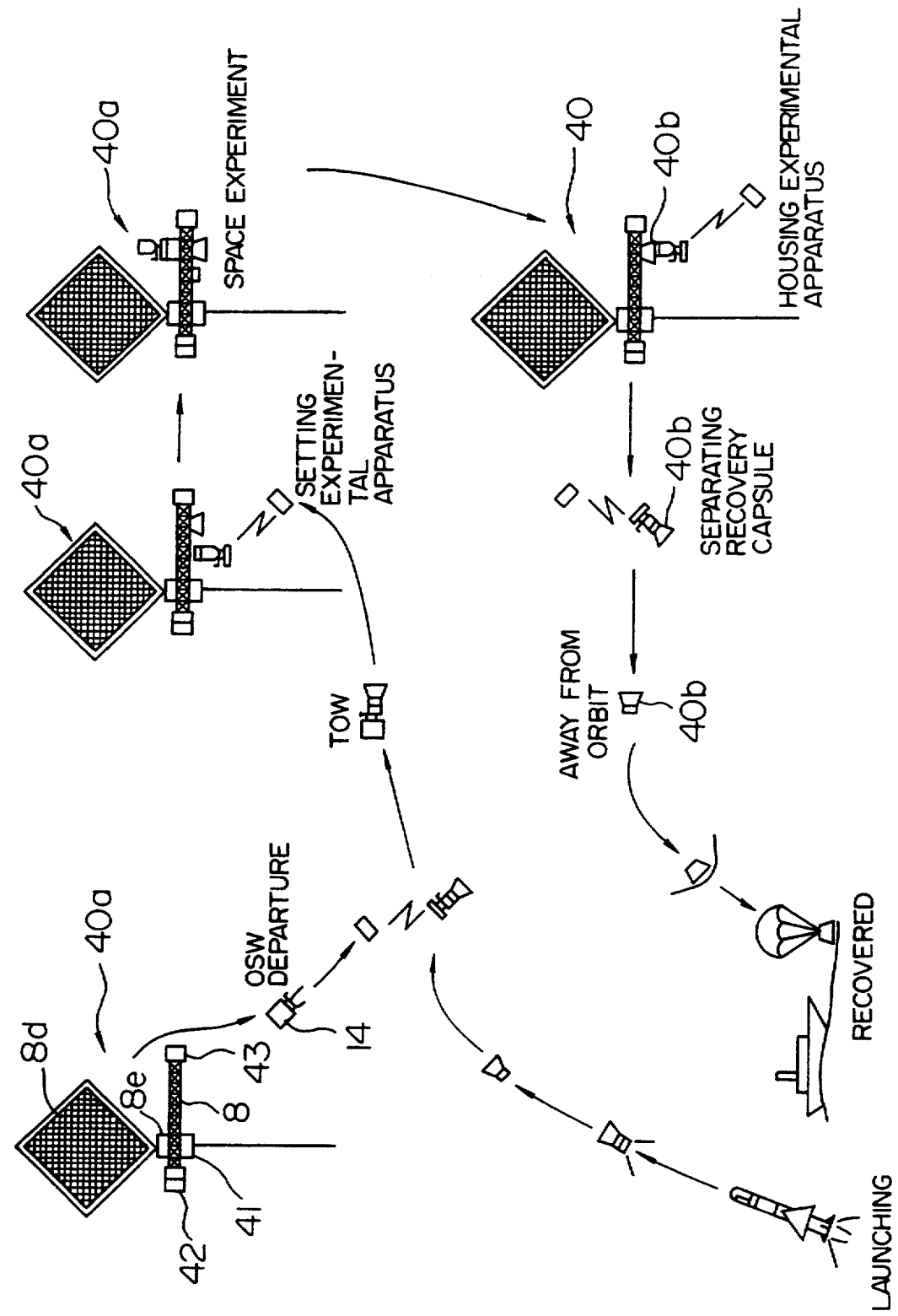

5,372,340

SPACECRAFT SYSTEM

BACKGROUND OF THE INVENTION

The invention relates to spacecrafts, and particularly to a spacecraft system having a plurality of spacecrafts carrying out missions in combination with each other.

The spacecraft is described in JP-A-56-99899, JP-A-61-268599 and JP-A-2-24073, and "Study of Near-by Working System in Space" in the 31st joint lecture meeting of space science and technology, 3G2.

A single spacecraft, as mentioned in the documents, is physically divided into two sections, or a moving portion and a stationary portion, which achieve their objects with ease.

SUMMARY OF THE INVENTION

It is an object of the invention to provide a spacecraft system having a plurality of spacecrafts which are provided with their own missions and communicate with each other to perform the missions, the spacecraft system thus being capable of rationally carrying out the construction and repair of space equipment.

It is another object of the invention to provide a spacecraft system capable of reclaiming old spacecrafts which are no longer operating to thereby maintain a more satisfactory space environment.

It is another object of the invention to provide a spacecraft system capable of carrying out various types of missions by combining a plurality of spacecrafts.

It is another object of the invention to provide a spacecraft system capable of carrying out a mission by detaching components from a useless spacecraft and combining the detached components with functioning components of other spacecrafts.

It is another object of the invention to provide a spacecraft system capable of building a large system comprising spacecrafts, each of which acts as an independently operated function.

The feature of the present invention is that each of the spacecrafts has at least a communication apparatus and a mission having at least one operation function. In addition, mission objects are floated in outer space together with the spacecrafts and are combined for the mission. Moreover, a central control station controls the spacecrafts and mission to operate through the communication apparatus.

The spacecraft may also include a propulsion apparatus for driving the space craft itself.

The spacecrafts which communicate with the central control station through the communication apparatus, can also communicate through a space repeater with the central control station.

The central control station can be installed while in space, an earth as well as on other planets.

The mission is divided into a plurality of units for respective independently operated functions so as to be separable from the spacecrafts, and stored in a system dock. The plurality of units include, for example, an orbital space worker, a communication unit, a posture control unit, a propulsion unit and a data processing unit.

The mission may also comprise a group of units for constructing up a complete space facility.

Of these units, the orbital space worker has a manipulator and includes at least a communication portion, a propulsion portion for driving the worker itself, and a driver for driving the manipulator.

The mission objects include a solar power generator having a photosensitive portion for receiving solar energy, a power transmitting portion for transmitting the converted electric power from the photosensitive portion to the ground, and a structure for mounting the photosensitive portion and the power transmitting portion, and the structure, apparatus and materials to be used in a space station, and so on. The mission apparatus further includes the orbital space workers, communication units, posture control units, propulsion units and data processing units kept separate from the spacecrafts, each of which has a plurality of units and is housed in the system dock. Furthermore, the mission apparatus includes older, inoperable spacecrafts.

The central control station may be a ground control station or a space control station.

The orbital space worker is used to combine at least the communication unit, the posture control unit, the propulsion unit and the data processing unit separated from a spacecraft in accordance with commands from the central control station and the spacecrafts. In addition, the orbital space worker is used to combine any one of at least the communication unit, the posture control unit, the propulsion unit and the data processing unit, with the solar power generator, structure, apparatus, materials and so on.

Furthermore, the orbital space worker is used to assemble a mission object in accordance with a command from a spacecraft in which this worker is housed, and in cooperation with other orbital space workers of spacecrafts.

Thus, a plurality of spacecrafts perform their own missions, so that a space station, a communication satellite, a supervisory satellite and so on can be rationally assembled. In addition, the old communication satellites which are no longer operating are recovered and reclaimed by removing or exchanging parts so that the useless floating residues can be removed from outer space and that the space environment can be kept satisfactorily clean.

BRIEF DESCRIPTION OF THE DRAWINGS

FIG. 3 is a table showing the comparison between the dispersion-type spacecraft system and the division-type spacecraft system;

FIG. 13 shows the construction of the orbital space worker assembled by a combination of units;

FIG. 17 shows the experiment of the transform spacecraft system;

FIG. 23 shows the structure of major units of the unmanned space laboratory base;

FIG. 24A is a perspective view of the unmanned space laboratory base;

FIG. 24B is a perspective view of an example of the orbital space worker;

FIG. 26 shows the recovery of waste products from the unmanned space laboratory base;

DESCRIPTION OF THE PREFERRED EMBODIMENTS

Figure 1:
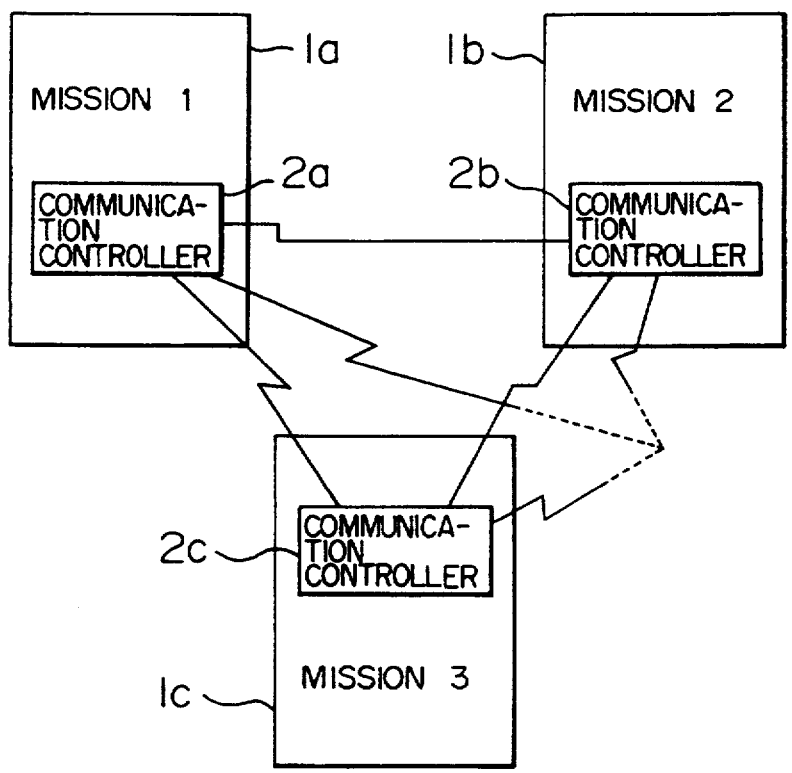
FIG. 1 is a block diagram of the principle of the dispersion-type spacecraft system of the invention.
Figure 2:
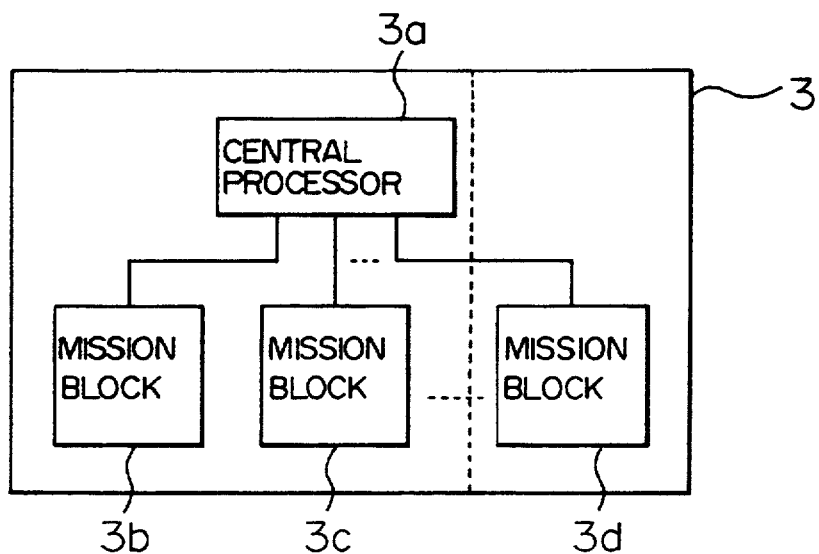
FIG. 2 is a block diagram of the conventional division-type spacecraft system.

Embodiments of the invention will be described with reference to the accompanying drawings. FIG. 1 shows an embodiment of the spacecraft system of the invention. Referring to FIG. 1, there are shown dispersion-type spacecrafts 1a, 1b and 1c which have missions 1, 2 and 3, respectively. The mission means 1, 2 and 3 comprise a group of units for making up a complete space facility. The spacecrafts 1a, 1b and 1c also have communication controllers 2a, 2b and 2c, respectively. FIG. 2 shows a conventional division-type spacecraft 3. The spacecraft 3 has a central processor 3a and mission blocks 3b, 3c and 3d. The mission blocks 3b, 3c and 3d have missions 1, 2 and 3, respectively. The dispersion-type spacecrafts 1a, 1b and 1c shown in FIG. 1 communicate with each other or with a ground control station or space control station not shown. In other words, the spacecrafts 1a, 1b and 1c are independent of each other, and carry out their missions 1, 2, 3, respectively. On the other hand, the conventional division-type spacecraft 3 is a single unit, and thus a plurality of missions 1, 2 and 3 are dependent upon each other, and are sequentially performed one by one. FIG. 3 is a diagram showing the comparison of the dispersion-type spacecrafts 1a, 1b and 1c with the division-type spacecraft 3. The division-type spacecraft 3 is excellent in its working property, but poor in the extensibility, or unfoldability, maintainability, continuity of operation and realization expectancy.

The extensibility means a possibility for building up spacecraft systems extensively. In the dispersion-type spacecrafts, a spacecraft is launched and combined with a conventional spacecraft to carry out a new mission. In the division-type spacecrafts, a new mission cannot be carried out in combination with other crafts. For maintaining the spacecraft the dispersion-type is favorable since the components can be changed in comparison with the division-type. Regarding continuity of the operation, the dispersion-type is more favorable as well.

In the case that the dispersion-type spacecraft is operated practically, since the spacecrafts are independently operable, it is possible to transmit operation commands to the spacecrafts individually. If it is not possible to operate the missions independently, the spacecraft is manually operated, and the operation to the spacecraft is increasingly complicated.

Accordingly, in case of building a large space structure, for example, a solar power satellite, it is possible to build up the satellite step by step with use of the dispersion-type spacecraft, so that the structural work can be built on an increasing scale.

The dispersion-type spacecrafts 1a, 1b and 1c lack ease of operation, but satisfy the other requirements. In addition, the dispersion-type spacecrafts are most capable of performing the individual parts of operation of the missions. A solar power satellite as an example of this operation realization will be described below.

Figure 4:
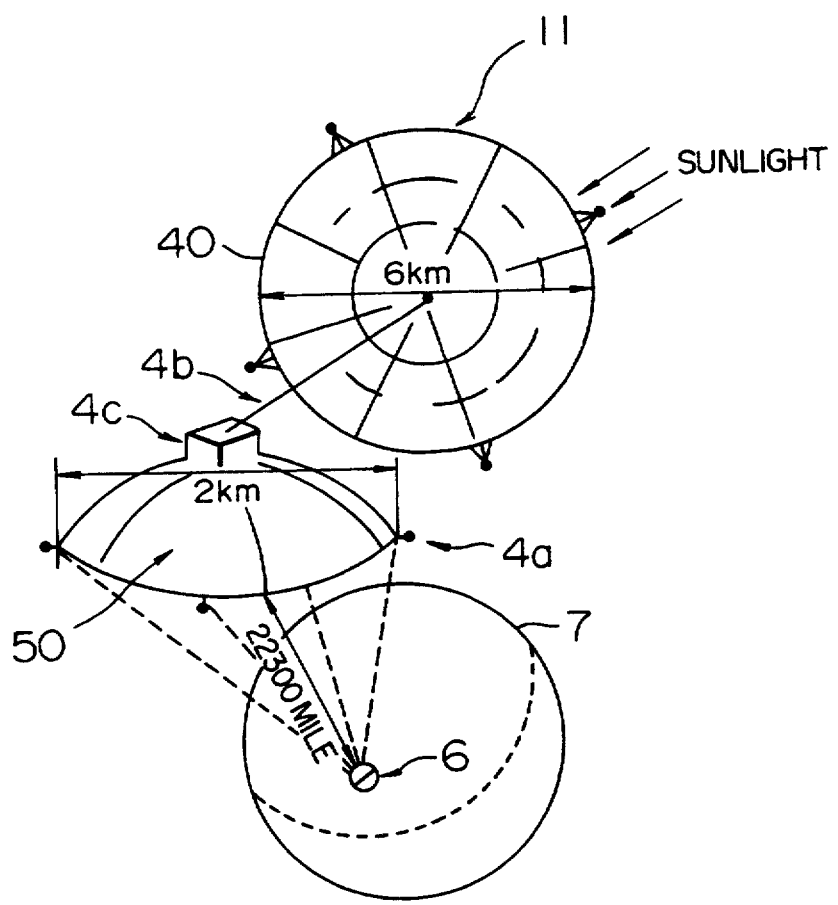
FIG. 4 shows one example of the solar power satellite.
Figure 5:
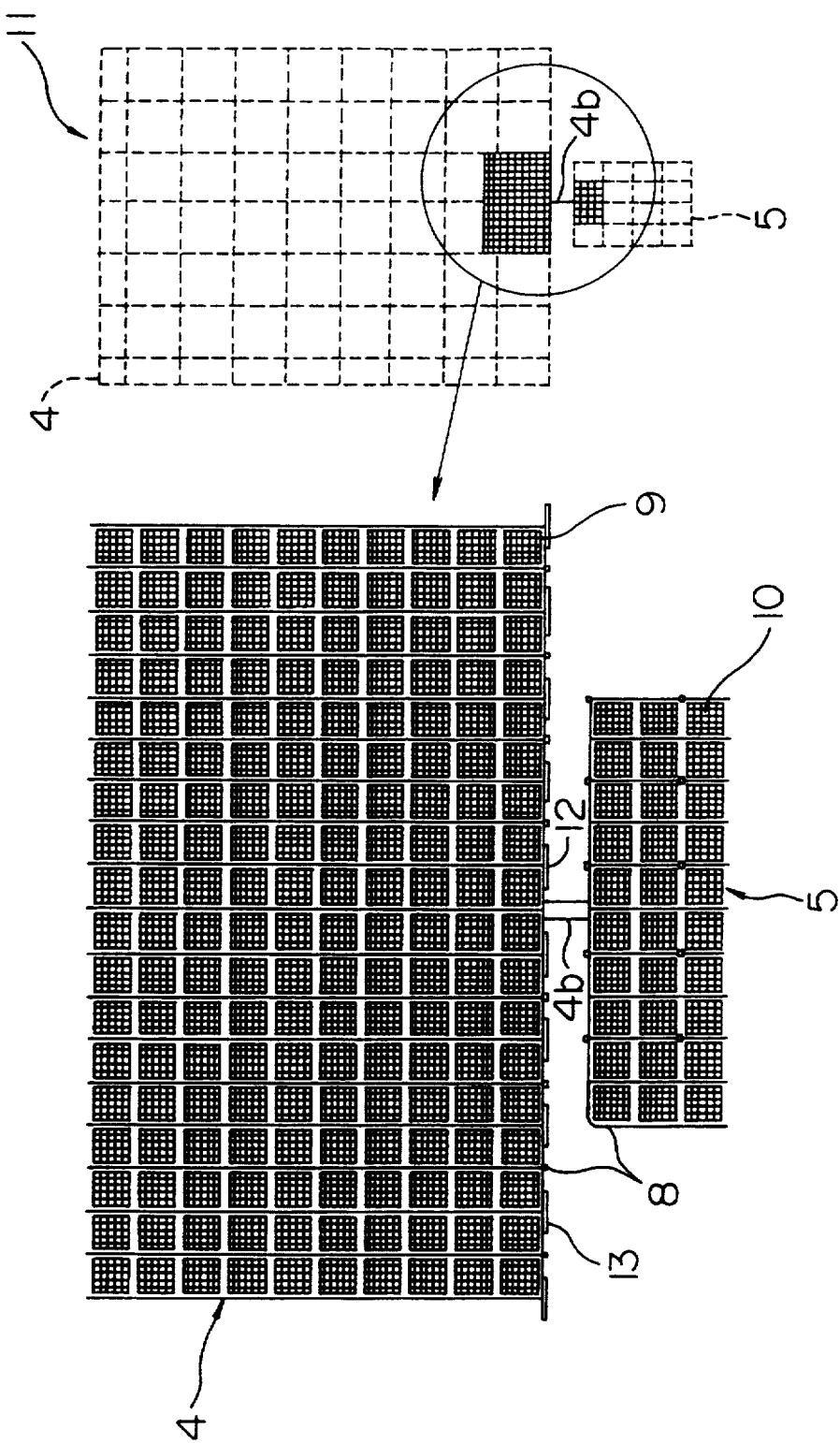
FIG. 5A is a plan view of another example of the solar power satellite.
FIG. 5B is a magnified detailed diagram of the portion surrounded by a circle in FIG. 5A.

FIG. 4 shows a conventional division-type solar power satellite 11. Referring to FIG. 4, there are shown a solar cell array 40, a power transmission antenna 50, a ground power receiving antenna, and the earth 7, each of these being separate entities. The solar cell array 4 has a direction controller 4a mounted thereon to control the direction of the antenna so that the antenna most effectively receive the rays of the sun. The solar cell array 40 and the power transmission antenna 5 are connected by a super conductive power-collecting circuit network 4b so that the electric power can be transmitted to the power transmission antenna 50. The power transmission antenna 50 has the direction controller 4a and a refrigerator 4c mounted thereon. A microwave is transmitted from the power transmission antenna 50 to the ground power receiving antenna 6.

In the solar power satellite shown in FIG. 4, since the solar power satellite was proposed by Dr. Graser, many researchers have been investigated for a power transmission system from various different angles. The invention has specifically examined the construction of the solar power satellite.

The construction and maintenance of the solar power satellite are one of the major technical problems. Since it is difficult to launch the apparatus assembled on the earth, and then place it in orbit, the materials are launched and then assembled while in orbit. However, the working conditions for an astronaut in space away from the spaceship is dangerous, and the effort is costly and time-consuming and thus it is considerably difficult. Thus, in place of the astronaut, an unmanned spacecraft can be considered to be developed for the space action. In other words, the units, each of which constitutes the solar power satellite, are treated as separate spacecrafts, and are ordered to be connected to each other. In addition, in place of the man, an orbital astronaut/space worker combines the units constituting the solar power satellite. The development of the basic technology of the construction of the solar power satellite will be described with reference to FIGS. 5 to 8.

Figure 6:
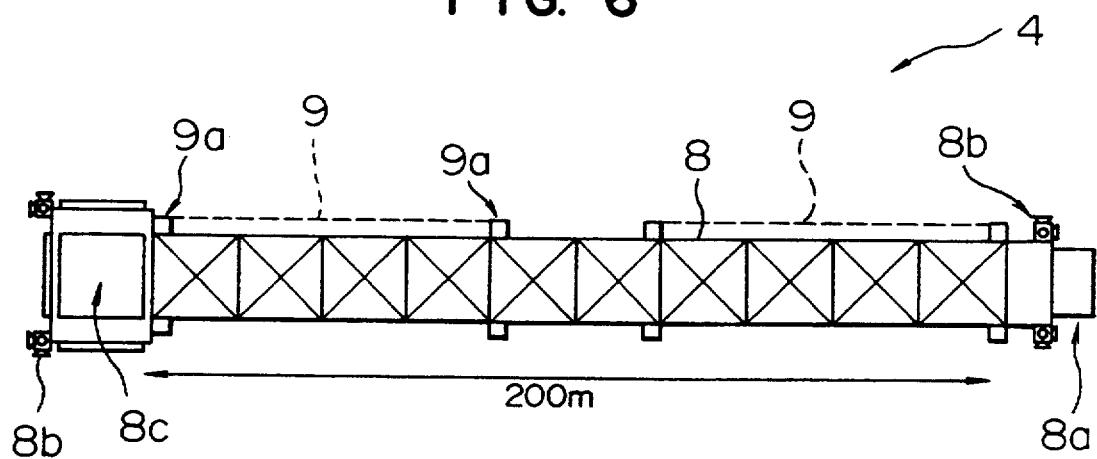
FIG. 6 is a side view of the structure unit.
Figure 7:
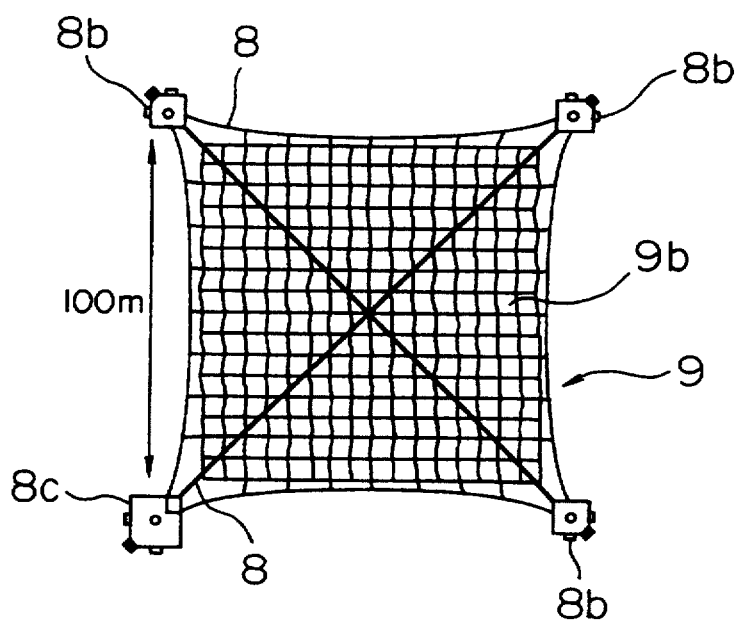
FIG. 7 is a plan view of a power generation unit shown in FIG. 6.

FIG. 5A shows example of the solar power satellite 11 in the present invention in contrast to the conventional type shown in FIG. 4. The materials for constructing the solar power satellite 11 are launched into outer space and assembled independently in orbit as illustrated. The operation of assembling the solar power satellite 11 in orbit will be described later. As shown in FIG. 5A, the solar cell array 4 in the present invention and the power transmission antenna 5 are each of a rectangular shape. FIG. 5B shows a magnified view of the encircled portion. As shown in FIG. 5B, the solar cell array 4 is formed of a plurality of power generation units 9, and these power generation units 9 are supported by a structure unit 8. Also, the structure unit 8 has power control units 13 mounted thereon. These power control units 13 control the levels of the power generated from the power generation units 9. Moreover, command portions 12 are mounted on the structure unit so as to monitor the power generation units 9 and to monitor the angle of the solar cell array 4 to the sun light, thereby allowing the cells to effectively receive rays from the sun. The power transmission antenna 5 is formed of a plurality of power transmission antenna units 10. These power transmission antenna units 10 are supported by the structure unit 8. Although not shown in FIGS. 5A and 5B, communication units are also mounted thereon so as to receive commands from the spacecrafts 1a, 1b and 1c described in FIG. 1. FIG. 6 is a side view showing the details of the solar cell array 4, the power transmission antenna 5 and the structure unit 8 shown in FIGS. 5A and 5B. The structure unit 8 has power generation unit connectors 9a mounted through which the power generation units 9 can be mounted on the structure unit 8. Thus, the power generation units 9 can be easily mounted on the structure unit 8 while in orbit. The structure unit 8 has a docking module 8a mounted at one end so as to be connected to another structure unit 8. In addition, the structure unit 8 has thrusters 8b mounted at both ends to project the structure unit 8 through space. Furthermore, a core vehicle 8c is mounted on one end of the structure unit 8. The structure shown in FIG. 6 is one operation unit of solar cell array 4. The single core vehicle 8c is mounted on each operation unit. These operation units of solar cell array 4 are mostly assembled into a plurality of solar cell arrays 4. FIG. 7 is a plan view of the power generation unit showing one operation unit of solar cell array 4. The power generation unit 9 is formed of a plurality of solar arrays 9b. The structure unit 8 shown in FIGS. 6, and the thruster 8b, core vehicle 8c and docking modules 8a which are mounted thereon, constitute one spacecraft. In other words, the structure unit 8 constitutes an independent spacecraft, or a dispersion-type spacecraft.

Figure 8:
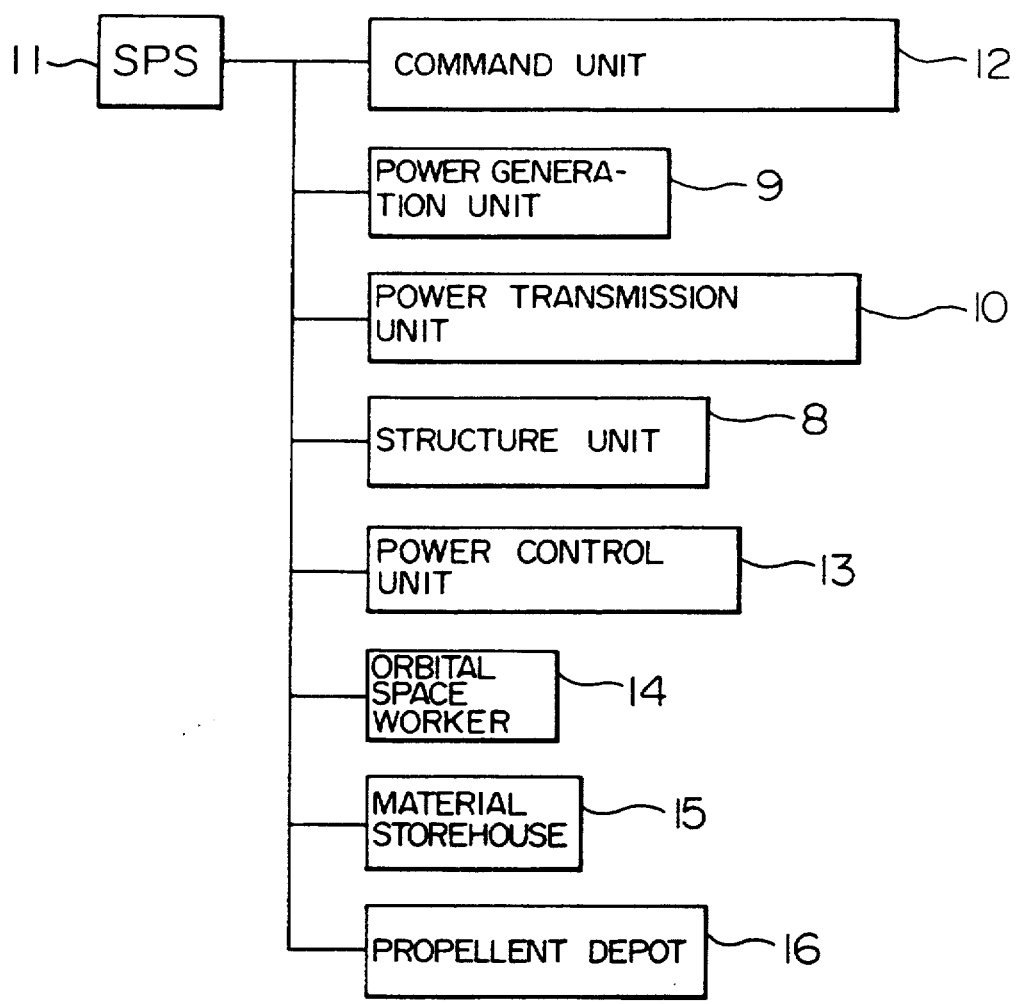
FIG. 8 shows major components of the solar power satellite based on the virtually connected spacecraft system.

FIG. 8 shows the materials and apparatus which are necessary to form the solar power satellite 11 mentioned above. In other words, the solar power satellite includes the apparatus of command unit 12, power generation unit 9, power transmission antenna unit 10, structure unit 8, power control unit 13, orbital space worker 14, material storehouse 15, and propellant depot 16. Of these apparatuses, the structure unit 8 and power generation unit 9 have already been described with reference to FIGS. 6 and 7. The other apparatuses or units each have a communication section and a drive section and act as independent spacecrafts, each having an independently operated function. Thus, the power transmission antenna 10, command unit and power control unit 13 of the solar cell array 4 and power transmission antenna 5 shown in FIGS. 5A and 5B respectively act as independent spacecrafts, or dispersion-type spacecrafts like the structure unit 8 and the power generation unit 9. These units are, collectively or individually, launched from the ground into outer space, and thrown into orbit from the mother spacecraft, as required.

Of the units necessary for assembling the solar power satellite 11, the command unit 12 receives commands from the mother spacecraft, ground control station or space control station, and orders one operation unit of the solar power satellite 11 to be connected to other operation units by driving the thruster 8b. The plurality of units shown in FIG. 8 are major units. If these units are assumed to be a system dock, the system dock is formed of about 200 units. Therefore, the solar power satellite 11 is constructed by units of the system dock. The respective units of one system dock have a command leader not shown. The command leaders of the units are ordered to connect to each other by the command unit 12. The orbital space worker 14 of the units, as described later, is provided for each 10 system docks, for example. One or a plurality of orbital space workers 14 work together. The material storehouse 15 stores materials necessary for the solar generation satellite 11, and the propellent depot 16 stores fuel for propulsion. The system docks are housed in the mother spacecraft.

The orbital space worker 14 will be described below. Each of the units constituting the solar power satellite 11 acts as one spacecraft. Each spacecraft makes a rendezvous and docks on the basis of the command from the command unit 12. The orbital space worker 14 performs a plurality of automated high-grade operations. That is, the orbital space worker 14 executes the construction and maintenance operations, and responds to the commands from the ground control station or space control station to freely move in orbit.

Figure 9:
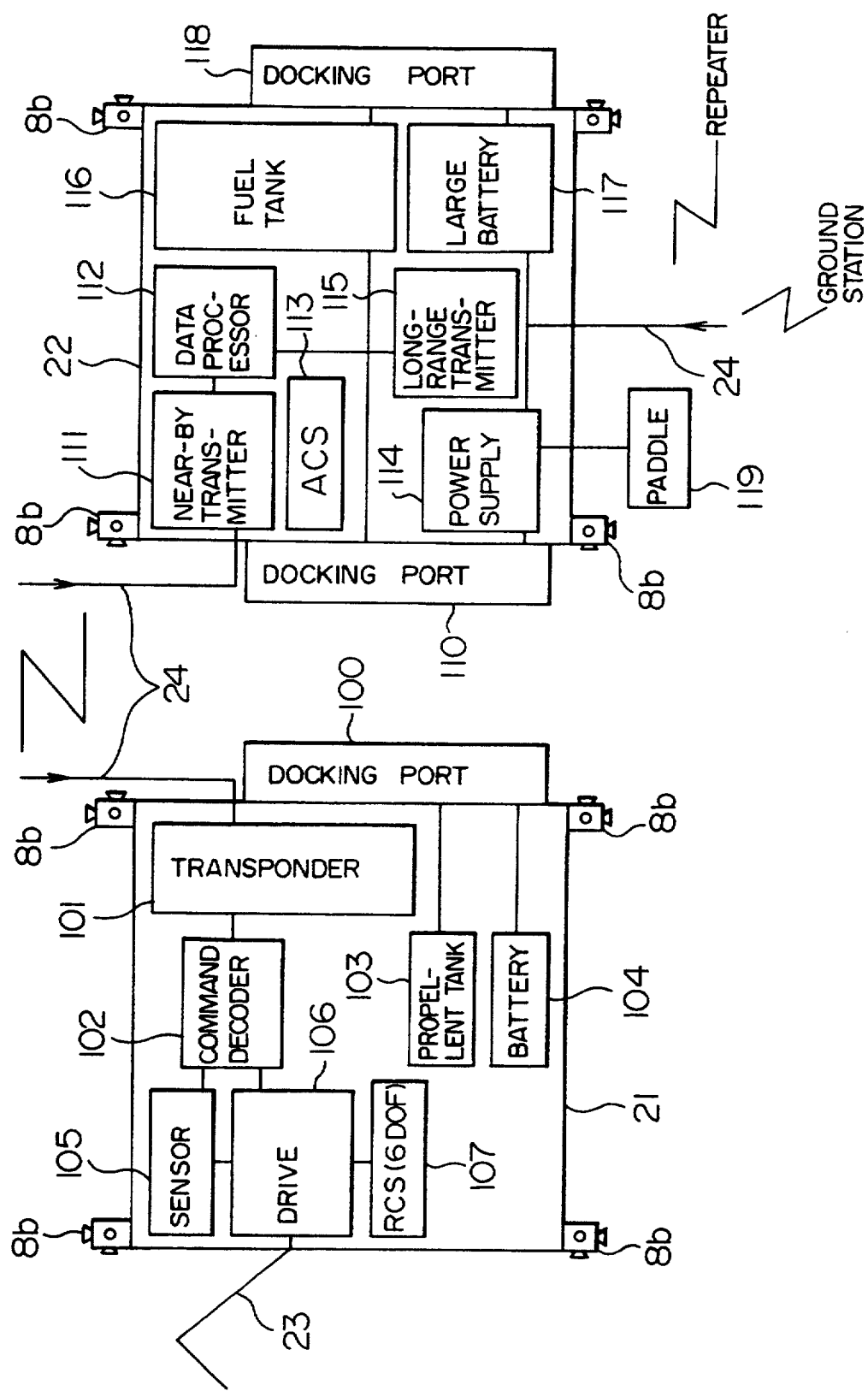
FIG. 9 is a block diagram of the construction of the orbital space worker.
Figure 10:
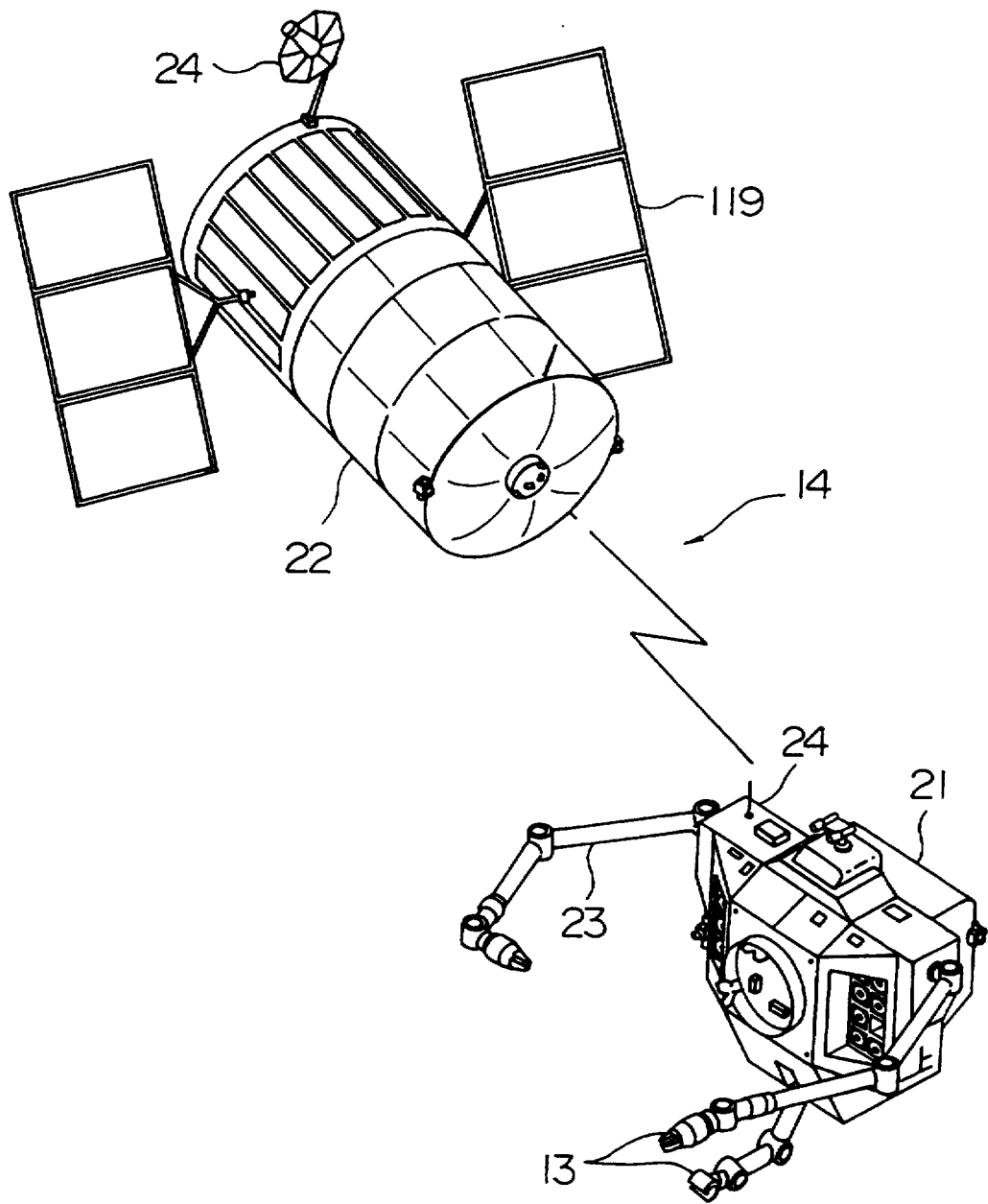
FIG. 10 is a perspective view of the orbital space worker in space.

FIG. 9 shows one example of the orbital space worker 14. The orbital space worker 14 is formed of an operation executing portion 21 and a management/control portion 22. The operation executing section 21 and the management/control section 22 have docking ports 100 and 110, respectively. When housed in the mother spacecraft, the docking ports 100 and 110 are connected to each other. When the orbital space worker 14 is thrown into orbit from the mother spacecraft, both the portions are separated as a result of the disconnection of the docking ports 100 and 110 as shown in FIG. 9. Since the orbital space worker 14 is one unit within the system dock, it has at least the command leader which receives the command from the command unit 12, and has the same function as the command unit in order to receive the commands from the ground control station or space control station. The management/control section 22 corresponds to this command unit. The management/control section 22 has an antenna 24 for receiving the commands from the ground control station or space control station, a long range communication portion 115 for amplifying the command to a certain level, a data processor 112 for discriminating the signals from the long range communication portion 115, a short range communication portion 111 and antenna 24 for further transmitting the processed signal to the operation executing portion 21, a high performance computer 113, a large-capacity battery 117, a power section 114 for charging the power from a solar battery paddle 119 to the large-capacity battery 117, and a fuel tank 116. The fuel tank 116 is used to supply fuel to and drive the docking port 110 and the other docking port 118 when the management/control section 22 is connected to another unit. Also, the management/control section 22 has the thruster 8b mounted thereto, as do the other units. The operation executing portion 21 has the antenna 24 for receiving the command from the management/control section 22, a transponder 101 for relaying the received command, a command decoder 102 for decoding the command from the transponder 101, and a drive controller 106 for driving an arm 23 in accordance with the decoded command. Also, it has a sensor circuit 105 for detecting the operation of the arm 23 through the drive controller 106, a reaction control subsystem (RCS) 107 for controlling the drive controller 106 to control the arm 23 to make a certain operation, a battery 104, and a propellent tank 103 for supplying fuel to the docking port 100 to drive it. The operation executing portion 21 also has the thruster 8b mounted like the management/control section 22. FIG. 10 schematically shows the management/control section 22 and operation executing portion 21.

The orbital space worker 14 has the following functions:
- To alter the orbit and carry or tow the materials when the materials are transported between the mother spacecraft and the solar power satellite 11,
- To access a target of the solar power satellite 11,
- To make docking and berthing with other units,
- To assemble and maintain the units
- To check and examine the solar power satellite itself, including all separable units and parts of units,
- To make a diagnosis and servicing of the solar power satellite and other solar power satellites; and
- To cooperate with astronaut in other operations.

Figure 11:
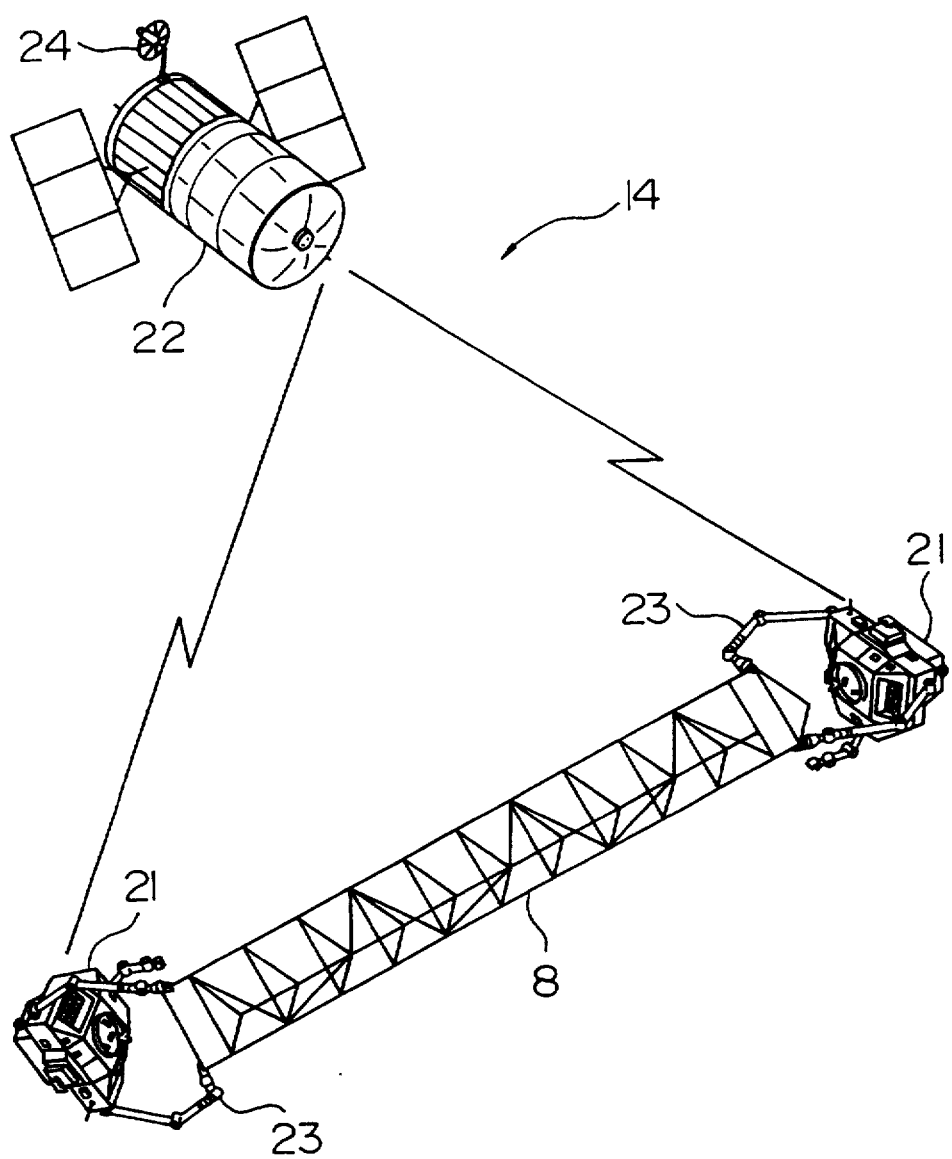
FIG. 11 is a perspective view of a plurality of orbital space workers in space.

FIG. 11 shows the operation of the orbital space worker 14. In this case, two operation executing portions 21 are ordered to carry the structure unit 8 by one management/control portion 22.

As described above, the orbital space worker 14 is comprised of the operation executing portion 21 and the management/control portion 22 as shown in FIGS. 9 and 10. However, the operation executing portion 21 can be directly operated as an orbital space worker from an operator in a space station. Also, in case the operation executing portion 21 and the management-/control portion 22 cannot work themselves so that the communication is not carried out from the central control station, an additional communication unit is used as a spacecraft having an independently operated function by arranging around the orbital space worker 14.

Accordingly, the orbital space worker 14 is of the disperse-type spacecraft and one example of the virtually connected spacecraft system.

As described above, these dispersion-type spacecrafts are complicated in their operations, but have excellent capabilities regarding extension, maintenance, and realization expectancy since the respective units have independently operated functions. In other words, the constructed portions can be operated before all other portions are completed, and thus the period from the start of construction to the start of operation can be shortened. In addition, since units can be added or changed, the construction can be modified and maintenance is made easy.

The units each having a function constituting the solar power satellite 11 mentioned with reference to FIGS. 5 to 11 are horizontally propelled into orbit. The order of operation in which the units are connected in this way can be called the virtually connected spacecraft system.

The virtually connected spacecraft system has been described above in which the units each having a function are horizontally propelled into orbit. The transform spacecraft system in which the units each having a function, are propelled from the mother spacecraft so as to be vertically arranged. The orbital space worker 14 based on the transform spacecraft system is shown in FIGS. 12, 13 and 14.

Figure 12:
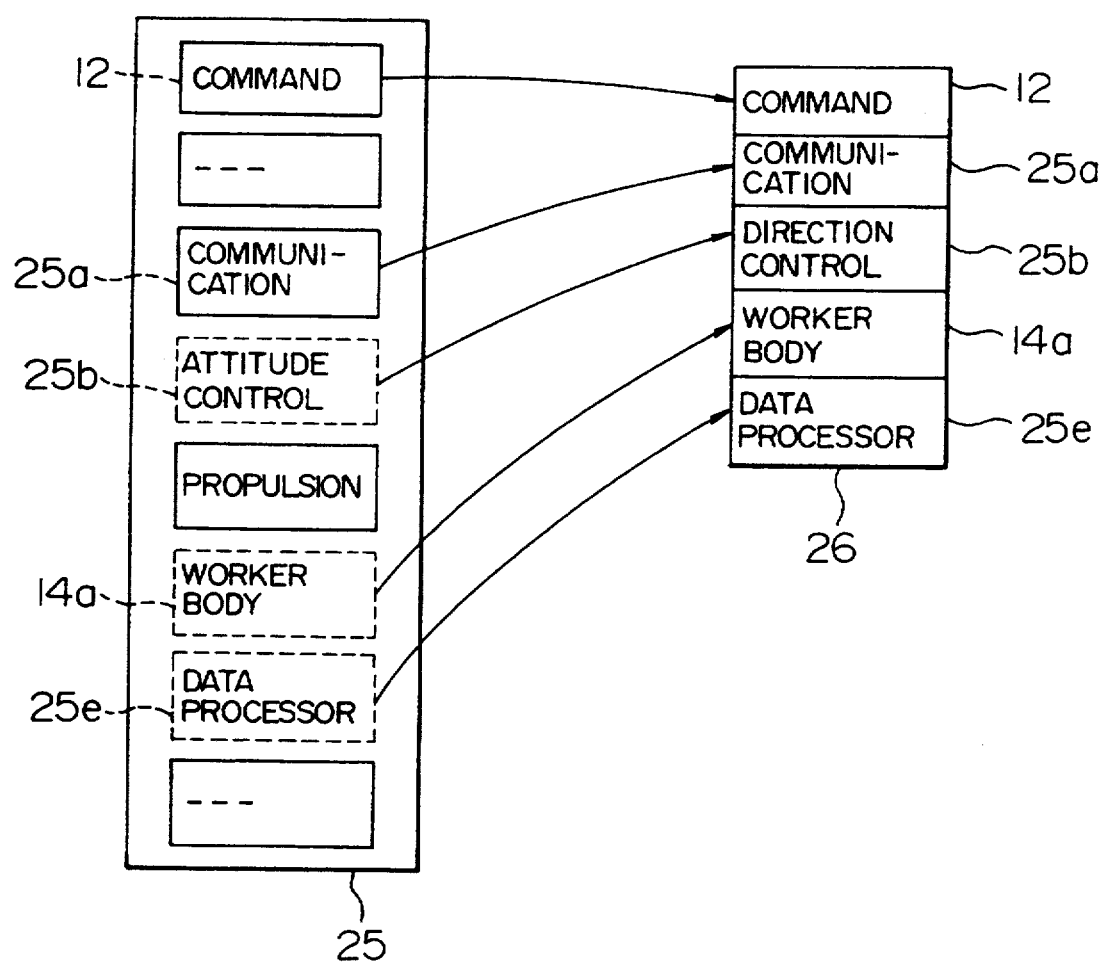
FIG. 12 shows the construction of the orbital space worker based on the transform spacecraft system.

Referring to FIG. 12, there is shown a system dock 25 which is housed in the mother spacecraft. The system dock has a plurality of units. The units are propelled into orbit from the system dock 25 when being assembled by the orbital space worker 14. The units mainly include the command unit 12, a communication unit 25a, a direction control unit 25b, propulsion unit 25c, a worker body 14a and a data processor unit 25e. These units are propelled from the system dock 25 into orbit, and then connected in the vertical direction as an operation configuration 26. As illustrated in FIG. 12, the units except the propulsion unit 25c are moved in parallel and are interconnected. The connection of the units is performed by the command from the command unit 12 to each unit. The orbital space worker 14 is formed by the combination of these units.

FIG. 13 shows a plurality of units housed in the system dock 25 for constructing the orbital space worker 14. These units are a worker mooring truss unit 200, a propulsion unit 201 including a propellent tank and a reaction control subsystem (RCS), a thruster, a core unit 202 including an antenna, a transponder, a data processor, a power supply and a battery, an extension power supply unit 203 including a paddle 119, a power controller and a large battery, a worker control unit 204 including an antenna 24, a transponder, a data processor/controller, a sensor circuit and a stereo camera, a worker arm unit 205 including an arm 23, an arm controller and a sensor circuit, a docking unit 206 including a docking port, and an extension propellent tank unit 207 including a large propellent tank.

Figure 14A:
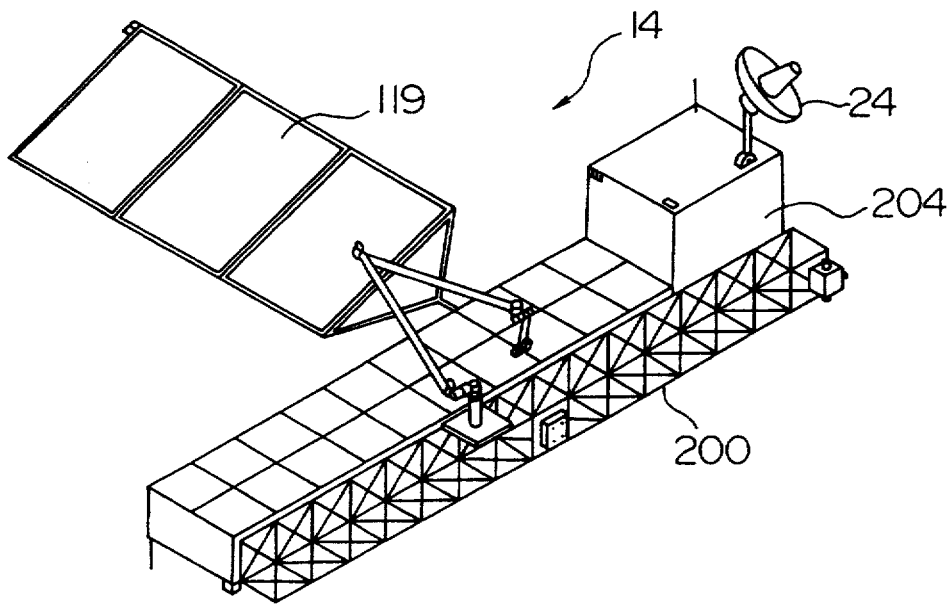
FIGS. 14A, 14B and 14C are perspective views of examples of the orbital space worker assembled by a combination of the units shown in FIG. 13.
Figure 14B:
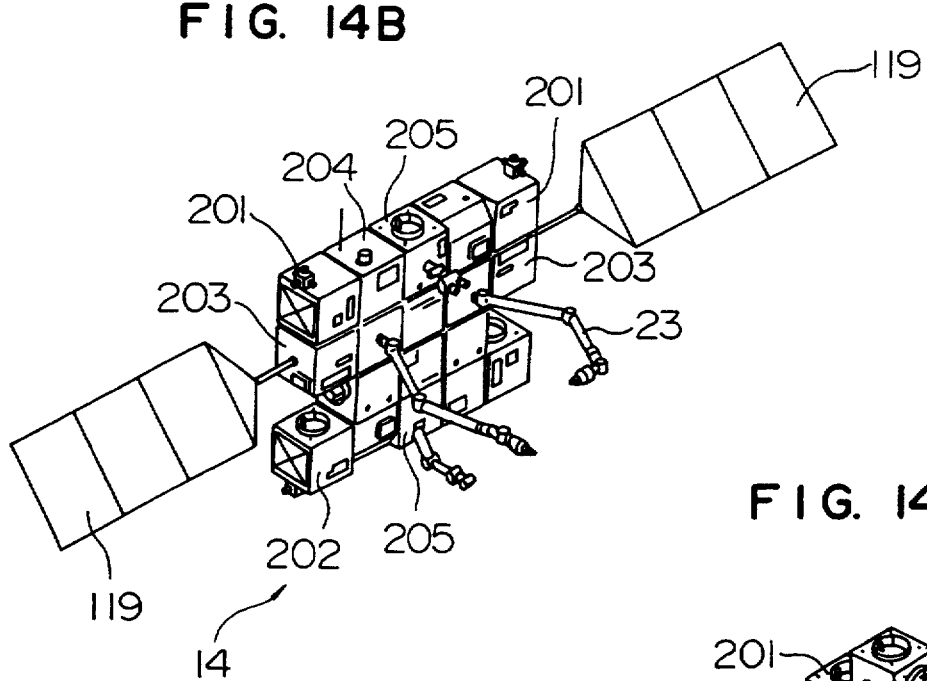
Figure 14C:
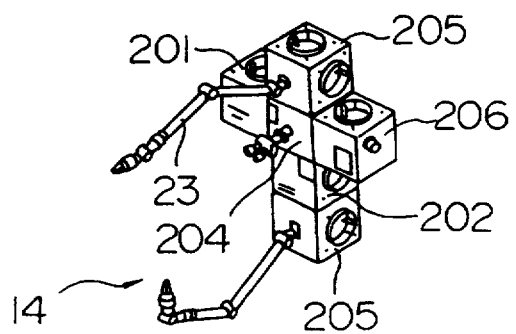

FIGS. 14A, 14B and 14C show the units that are connected in a vertical direction. The units are vertically connected by the orbital space worker 14. In other words, the orbital space worker itself is a group of a plurality of units, and the orbital space worker 14 with the units connected carries out the connecting operation. FIG. 14A shows a part of the orbital space worker which has the worker mooring truss unit 200, the worker control block 204 and the extension power supply block 203 connected in the vertical direction. FIG. 14B shows the orbital space worker 14 itself which has the propulsion unit 201, the core unit 202, the extension power supply unit 203, the worker control unit 204 and the worker arm unit 205 connected in the vertical direction. FIG. 14C shows the small-sized orbital space worker 14 which has the propulsion unit 201, the core unit 202, the worker arm unit 205 and the docking unit 206 connected in the vertical direction.

The above-mentioned transform spacecraft system is able to realize orbital space workers with various different functions by a combination of a plurality of units, if necessary and thus it is a highly efficient system. The transform spacecraft system has the following advantages.
- The units, upon failure, can be repaired and exchanged with ease.
- The optimum configuration of a spacecraft can be selected in accordance with the mission.
- The consumption of fuel and materials can be reduced to the minimum.

The idea of the transform spacecraft system can be applied to an extremely small microrobot for use in space, for which a need has been developed.

The transform spacecraft system which can be realized as another embodiment of the present invention is described below.

Figure 15:
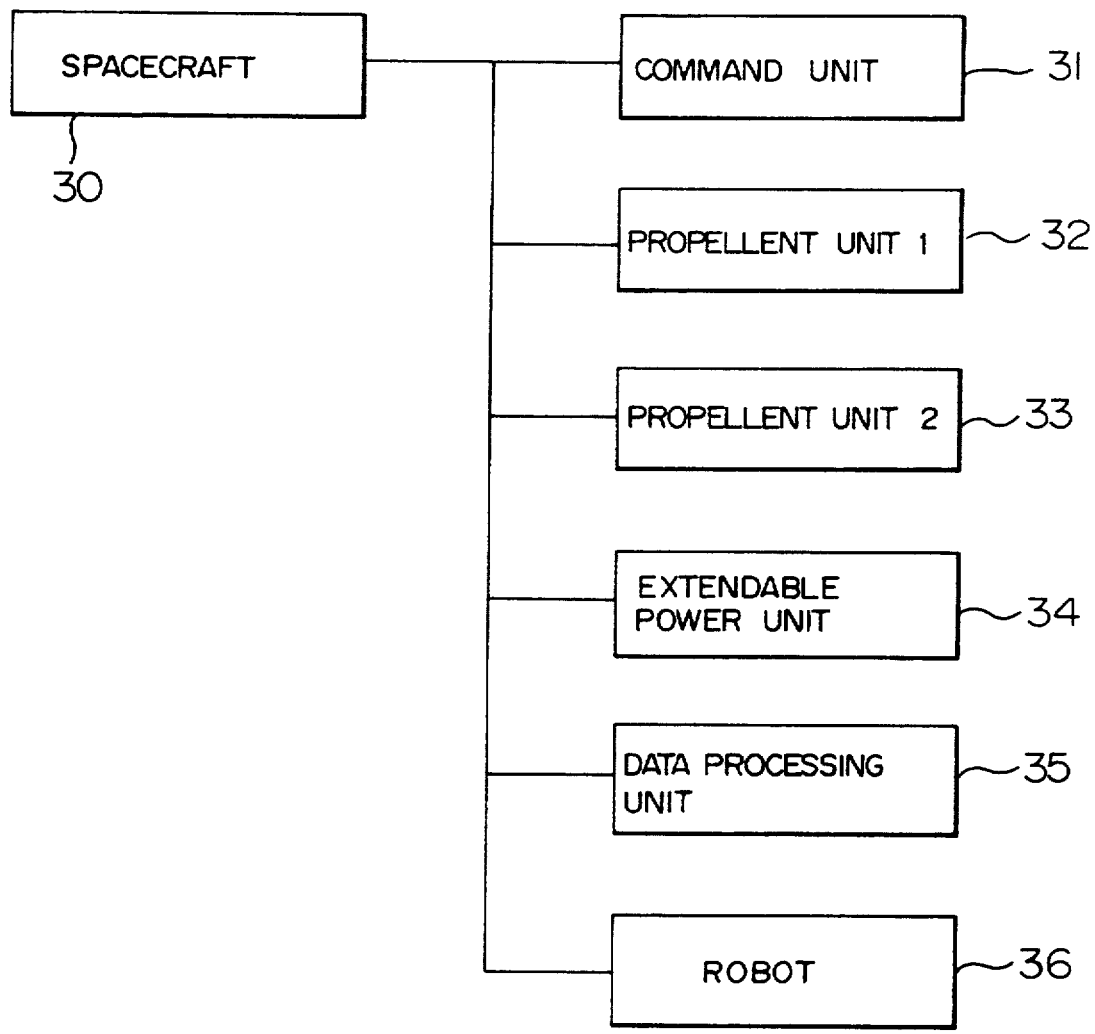
FIG. 15 shows another construction of the orbital space worker based on the transform spacecraft system.
Figure 16:
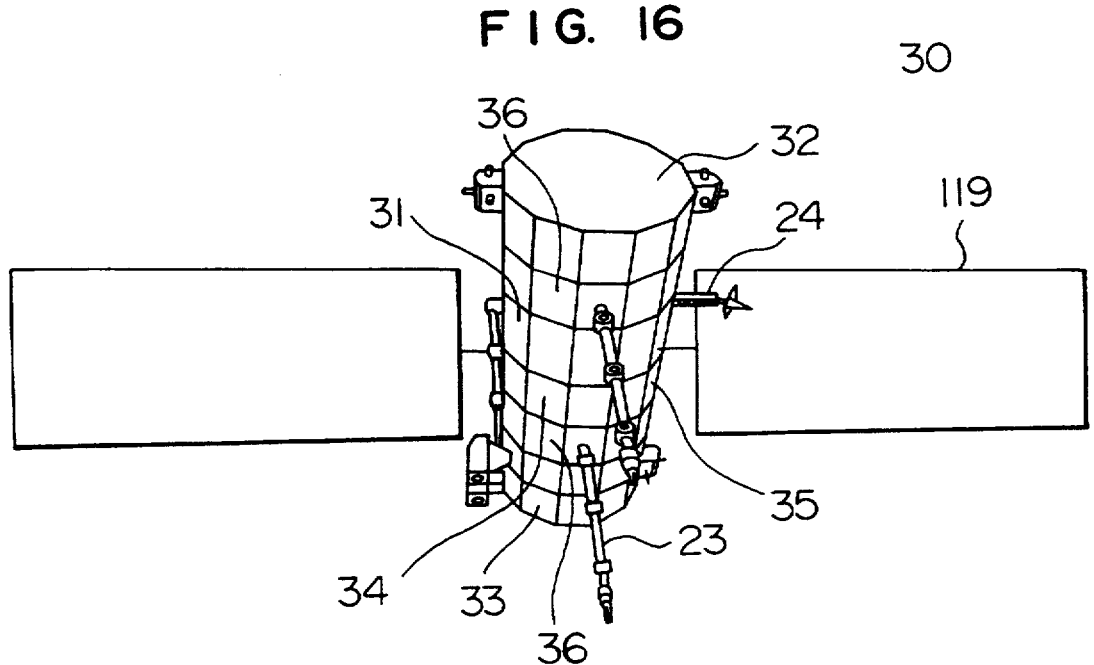
FIG. 16 is a perspective view of the orbital space worker of the construction shown in FIG. 15.

FIGS. 15 and 16 show the units of the spacecraft 30 of the transform spacecraft system for an experiment. FIG. 15 shows a plurality of units. These units include a command unit 31 for receiving the command from the mother spaceship and supplying a command to other units, two propulsion units 32 and 33 for the movement in the orbit and access to a target, an extension power supply unit 34 for backup, a data processor unit 35 for discriminating the commands received by the command unit 31, and a robot 36 having an arm and so on. These units are launched together from the earth into an orbit in outer space. FIG. 16 shows the spacecraft 30 launched into an orbit. The spacecraft 30 can be comprised of a small-scale satellite including plural units. This spacecraft 30 carries out the following operations:
- To change the units,
- To make manipulation operation by robot 36,
- To make docking and berthing, and
- To tow the payload.

The experiments for the transform spacecraft system will be described with reference to FIG. 17. The spacecraft 30 is launched by a rocket into outer space so as to orbit with the paddle and antenna opened. This is performed as the spreading experiment. The structure unit 30a is launched separately by a rocket into the orbit. The structure unit 30a is unfolded, or extended to a certain size since it is a long structure. This is also executed as the spreading experiment. Then, the spacecraft 30 and the structure unit 30a have a rendezvous with each other. A proper time after the rendezvous operation, the spacecraft 30 is separated into four portions and combined with the structure 30a. In other words, the units of the spacecraft 30 are separated into four parts, the propulsion units 32, 33, the extension power supply unit 34, the command unit 31 and data processor unit 35, and the propulsion units 32, 33 and a robot 36. Then, the extension power supply unit 34 is assembled into one side of the structure unit 30a, the command unit 31 and data processor unit 35 into the other side of the structure unit 30a, and the propulsion units 32, 33 and the robot 36 into the central portion of the structure unit 30a. The combination is assumed to be called the spacecraft 30b. The propulsion units 32 and 33 remain separated. The operation is performed as the experiment for the separation, reconfiguration and docking. Thereafter, the spacecraft 30b is towed by the propulsion units 32 and 33, or experimented for towing. After the end of the towing operation, the propulsion units 32, 33 and the robot 36 are separated from the spacecraft 30b, or the experiment for separation and reconfiguration are carried out. Then, the robot 36 separates the extension power supply unit 34, the command unit 31 and the data processor unit 35 from the structure unit 30a and combines the extension power supply unit 34, the command unit 31, the data processor unit 35 and the propulsion units 32, 33 in the vertical direction into a single unit, or the manipulation experiment is carried out. At this time, the robot 36 is also similarly assembled. The combination is assumed to be called a spacecraft 30c. The transform spacecraft system is thereby constructed. Then, the berthing experiment is carried out between the spacecraft 30c and the structure unit 30a, and the towing operation for the structure unit 30a is performed by the spacecraft 30c. The residual substances left after the assembly of the spacecraft 30c are moved together with the structure unit 30a.

Figure 18:
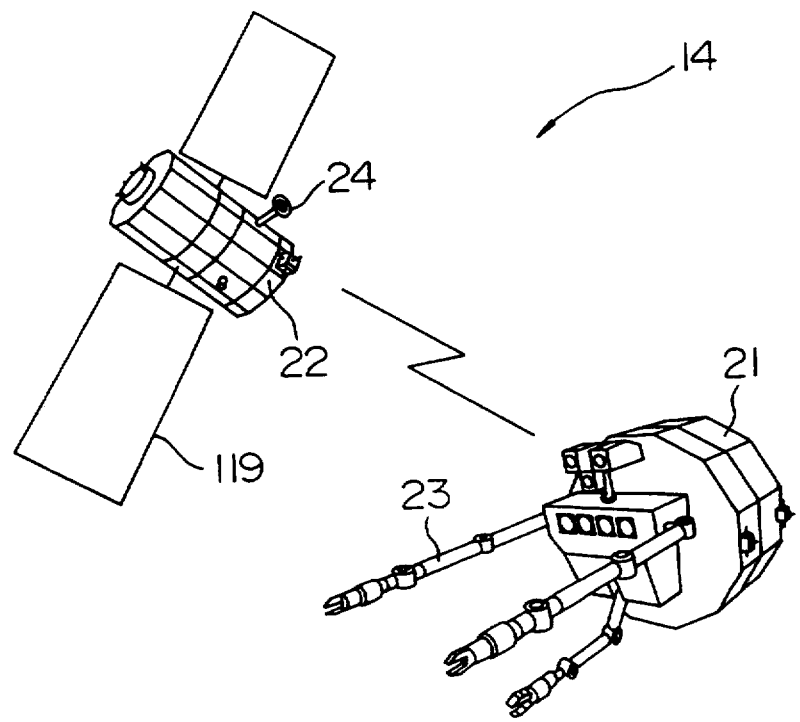
FIG. 18 is a perspective view of the orbital space worker to be used for the experiment of the virtually connected spacecraft system.
Figure 19:
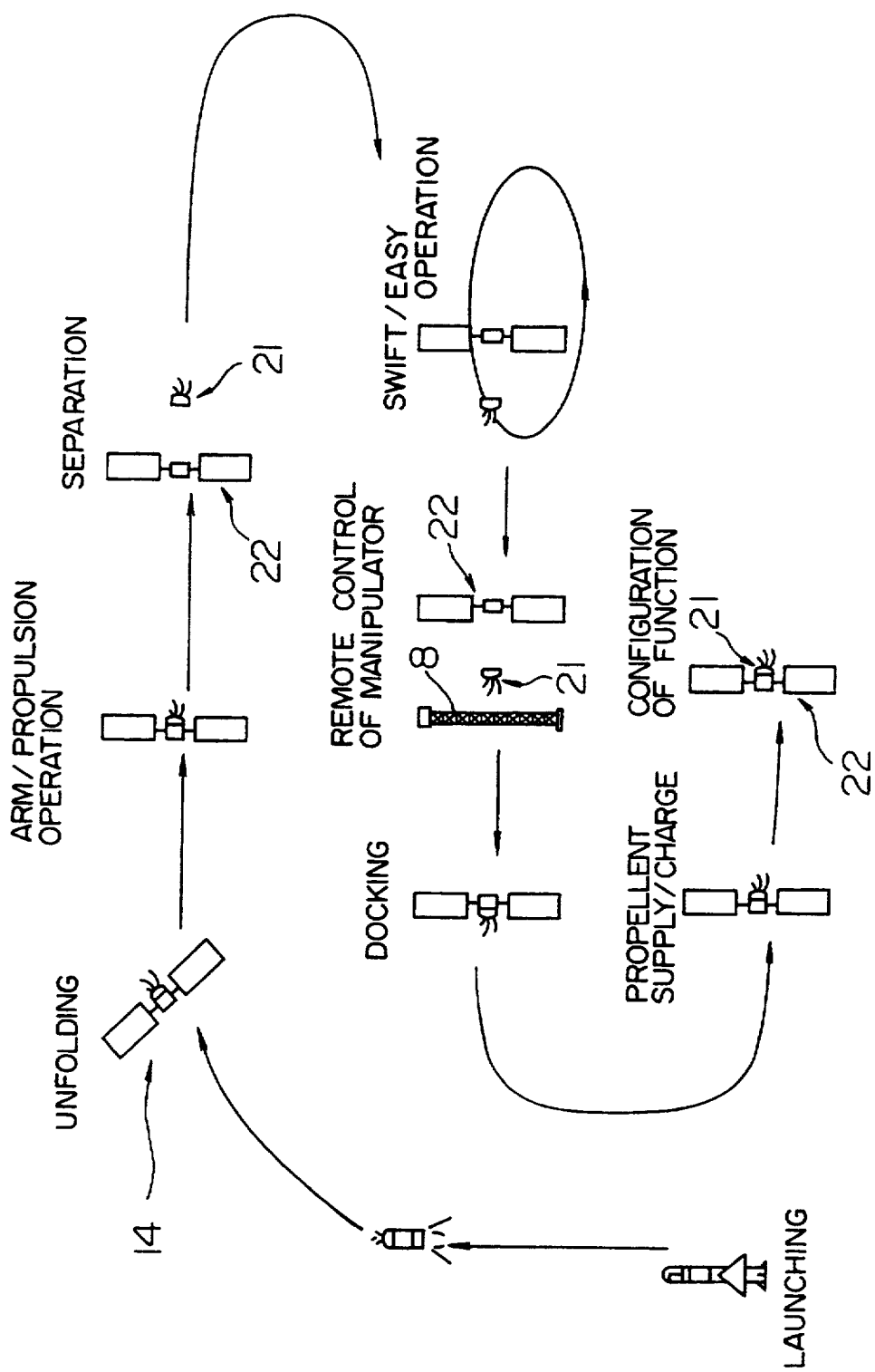
FIG. 19 shows the test of the virtually connected spacecraft system.

The operation for the virtually connected spacecraft system will be mentioned below. FIG. 18 again shows the robot 36 illustrated in FIG. 10. The robot 36 shown in FIG. 18 is formed of the management/control portion 22 and the operation executing portion 21. The management/control portion 22 is fundamentally the same as the construction shown in FIG. 9, and has the antenna 24 and paddle 119 extended from the body. On the other hand, the operation executing portion 21 is fundamentally the same as the construction shown in FIG. 9, and has the arm 23 extended from the body. The following operations are carried out by use of the orbital space worker 14:
- The confirmation of how to operate the orbital space worker 14,
- The confirmation of how to supply propellent,
- The confirmation of how to charge batteries,
- The direction control of the flexible structures,
- The orbital control of the flexible structure,
- The rendezvous and docking of the flexible structures,
- The cooperative control of spacecrafts,
- The cooperative operation of spacecrafts, and
- The handling of large spread type structures The operations for the virtually connected spacecraft system will be described with reference to FIG. 19. The management/control portion 22 and operation executing portion 21 are launched together by a rocket into an orbit in outer space. Then, the paddle 119 and so on are first tested for unfolding, and the arm 23 and thruster 8b of the operation executing portion 21 are tested for their operation. In addition, the operation executing portion 21 and the management/control portion 22 are tested for separation, and the operation executing portion 21 is tested to determine whether it can operate swiftly and easily. The operation executing portion 21 is made close to the structure unit 8, and the remote control experiment is carried out as to whether or not the manipulator such as arm 23 can operate satisfactorily. Thereafter, the docking experiment for the operation executing portion 21 and the management/control portion 22 is carried out and the propellent supply and battery charging experiments are performed. Finally, the detailed functions of the operation executing portion 21 and the management/control portion 22 are tested.

Figure 20:
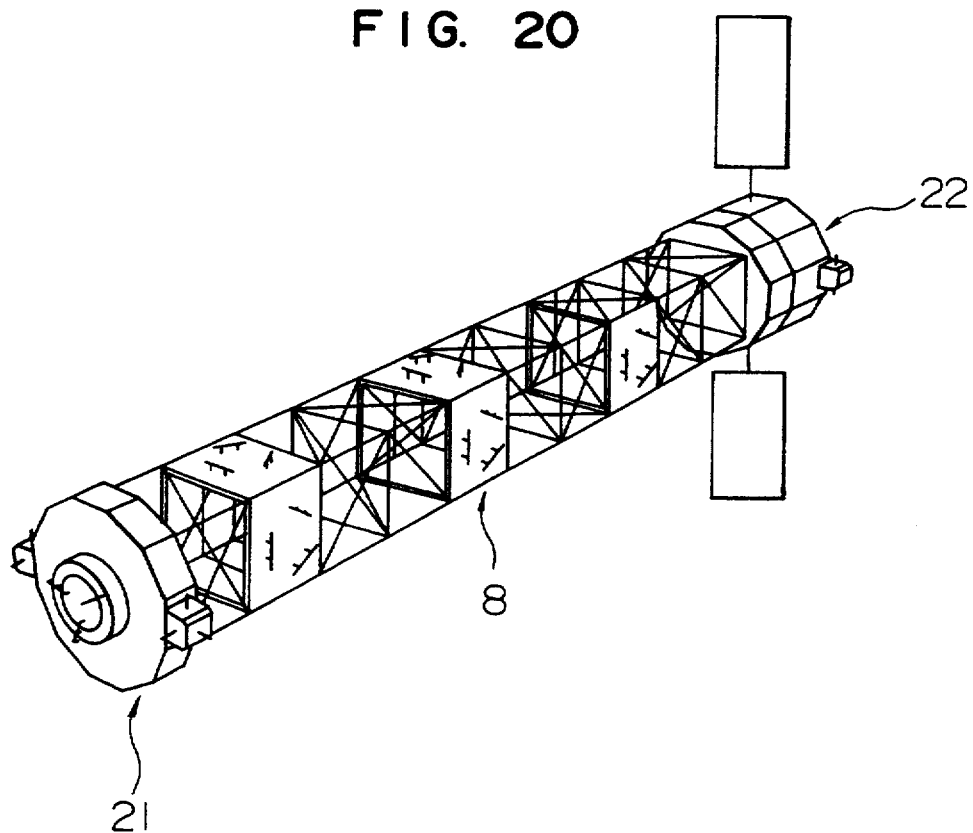
FIG. 20 is a perspective view showing an example of the transport of the structure unit by the cooperation of the management/control portion and operation executing portion of the orbital space worker.
Figure 21:
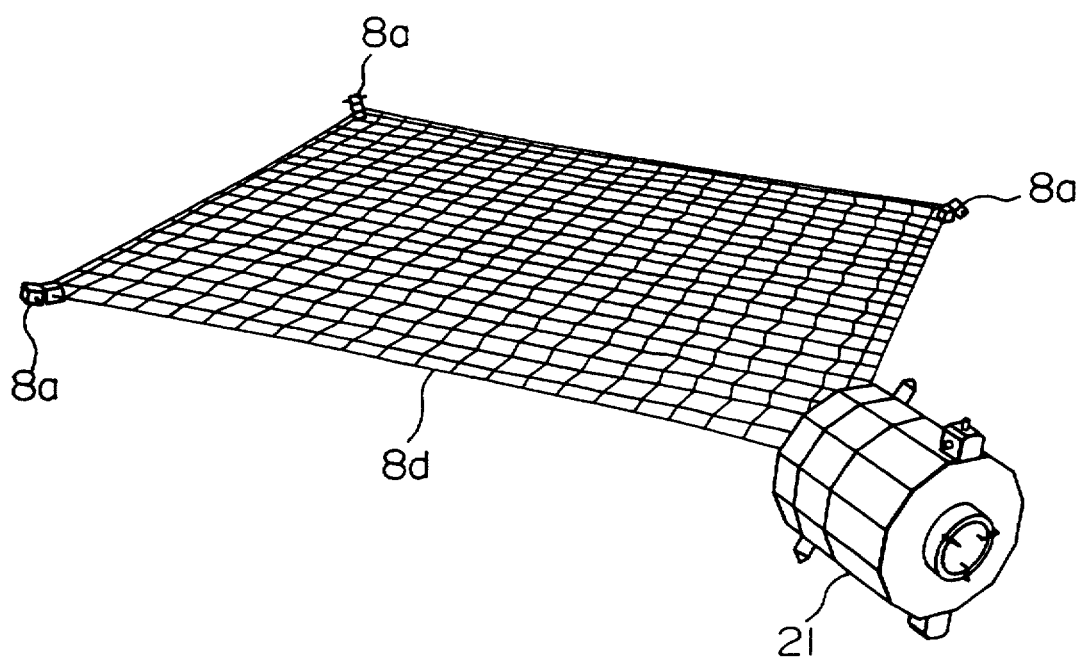
FIG. 21 is a perspective view of an example of the transport of a flexible structure.

FIG. 20 shows an example of the transport of the structure unit 8 by the cooperation of the operation executing portion 21 and the management/control portion 22. FIG. 21 shows another example of the transport of the flexible structure 8d by the operation executing portion 21.

Figure 22:
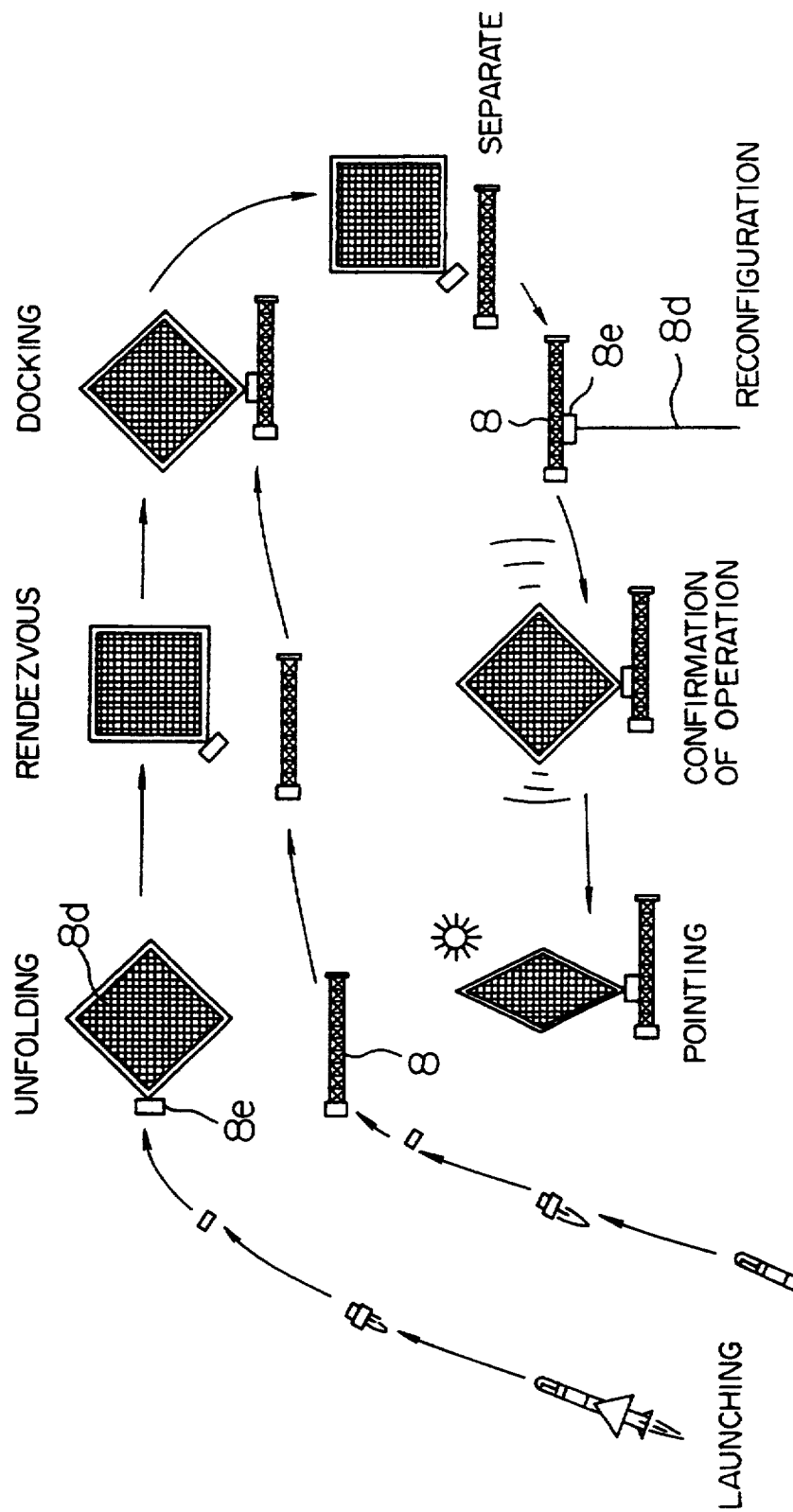
FIG. 22 shows the experiment of mounting the flexible structure on the structure unit.

FIG. 22 shows an example of the experiment for the flexible structure 8d. This experiment will be described below. The flexible structure 8d in a compressed state is launched by a rocket into an orbit in outer space, and then the unfolding operation is performed. The structure unit 8 in a compressed state is also launched by a rocket into the orbit, and tested for the unfolding operation. The flexible structure 8*d* and the structure unit 8 are, after the end of the rendezvous experiment, tested for the docking operation. In this operation, the rotating table, 8*e* of the flexible structure 8*d* is connected to a certain place of the structure unit 8. This docking operation is absolutely necessary for the construction of the solar power satellite. Then, the flexible structure 8*d* is tested for its separation from the structure unit 8, and the docking operation is performed for the structures. Thereafter, the flexible structure 8*d* is tested for its rotation around the rotating table 8*e*. In addition, the pointing test is carried out as to whether or not the surface of the flexible structure 8*d* is, for example, perpendicular to the rays from the sun. This operation is the most important when the flexible structure 8*d* is such as an unfoldable, or spreadable array.

The spacecraft system called the follow-on mission will be described below. The follow-on mission is used to prevent floating spacecrafts and debris from disturbing the space environment. In addition, this follow-on mission is used to effectively utilize the floating old spacecrafts such as communication satellites which no longer function in order to prevent these old spacecrafts from interfering with the other functioning spacecrafts. As the follow-on mission, an unmanned space laboratory base can be realized which utilizes the floating residues such as the old spacecrafts which no long function. FIG. 23 shows major units of an unmanned space laboratory base 40. Of these units, the orbital space worker 14 and the material storehouse 15 are selected from the residues of the solar power satellite, and the power generating unfolding-type array unit 41, the extension-type truss unit 42, and the cooling unfolding-type radiator unit 43 as additional units are launched from the earth into an orbit in outer space. FIG. 24A and 24B show constructed unmanned space laboratory base 40. The orbital space worker 14 is used for the construction and maintenance of the unmanned space laboratory base 40.

Figure 25:
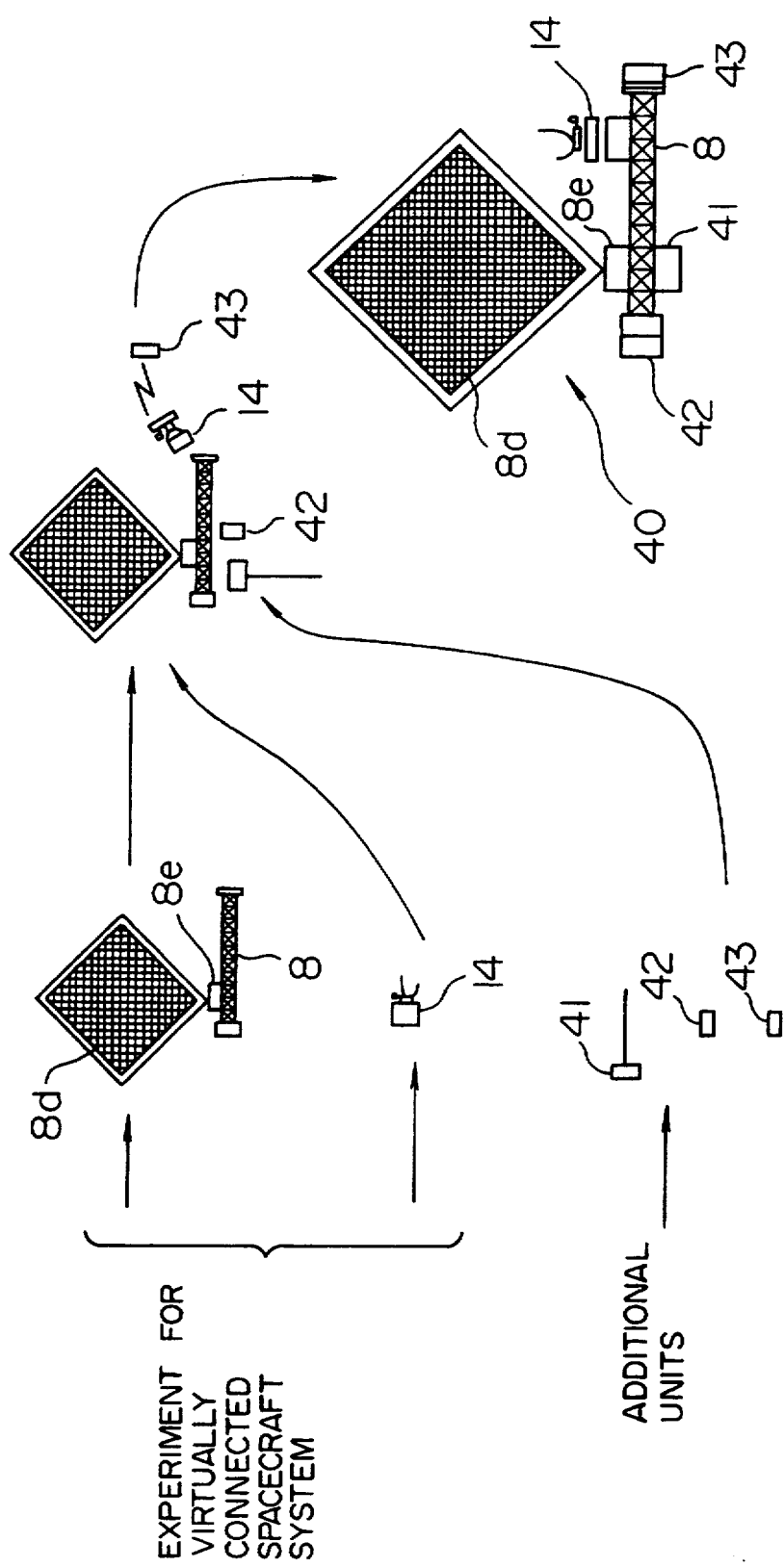
FIG. 25 is a perspective view of one example of the construction of the unmanned space laboratory base.

FIG. 25 shows one example of the construction of the unmanned space laboratory base 40. The unmanned space laboratory base 40 is constructed by the combination of the flexible structure 8*d*, rotating table 8*e* and structure unit 8 used in the experiment of the virtually connected spacecraft system previously described with reference to FIG. 22, the orbital space worker 14 and the additional units launched into the orbit. In addition, FIG. 26 shows the recovery of the waste products from the recovery capsule 40*b* after the construction of the space experimenting apparatus 40*a*. In other words, the orbital space worker 14 separates the recovery capsule 40*b* which collected the waste products, from the space experiment testing apparatus 40*a*, and the recovery capsule 40*b* is recovered back to the ground. In this way, it is possible to construct the spacecraft system which has the possibility of extension, maintainability, and realization expectancy.

We claim:

1. A spacecraft system for launching spacecrafts into outer space and causing said spacecrafts to execute cooperative operations, comprising:
a plurality of spacecrafts, each including at least a propulsion apparatus for driving the spacecraft itself, communication means for maintaining communications with other of said spacecrafts and said mission performing means for performing at least one operation function;
a mission object which floats in outer space and is treated in accordance with said mission means; and
central control means for operating said spacecrafts in accordance with said mission performing means through said communication means in which each of said plurality of spacecrafts communicate with one another through said communication means on the basis of a command from said central control means, and further actuate said propulsion means, and cooperatively treat said mission object in accordance with one of said mission performing means.

2. A spacecraft system for launching spacecrafts into outer space having a mission object which floats in outer space and is treated in accordance with mission performing means for controlling execution of cooperative operations by said spacecrafts, comprising:
a plurality of spacecrafts, each including at least a propulsion apparatus for driving the spacecraft itself, communication means for maintaining communications with other of said spacecrafts and said mission performing means having at least one operation function; and
central control means for operating said spacecrafts and said mission performing means through said communication means in which each of said plurality of spacecrafts communicate with one another through said communication means on the basis of a command from said central control means, and further actuate said propulsion means, and cooperatively treat said mission object in accordance with one of said mission performing means.

3. A spacecraft system according to claim 2, further comprising a space repeater station for enabling communication with said spacecrafts.

4. A spacecraft system according to claim 1, wherein said mission object includes construction materials, electric materials, mechanical materials, chemical materials, waste products, subsistence goods, and research materials.

5. A spacecraft system according to claim 1, wherein said spacecrafts include an orbital space worker.

6. A spacecraft system according to claim 1, further comprising a space repeater station for enabling communication with said spacecrafts.

7. A spacecraft system according to claim 1, wherein said mission means comprises a plurality of units which are provided for respective operation functions and can be separated from said spacecrafts, therefore said mission means can be formed of various types of operation functions.

8. A spacecraft system according to claim 7, wherein said plurality of units are interchangeably connected and include at least a command unit, a power generation unit, a structure unit, an orbital space worker, a communication unit, a direction control unit, a propulsion unit, a data processing unit, a material storehouse, a propellent unit depot and an extension power supply unit.

9. A spacecraft system according to claim 5, wherein said orbital space worker comprises a manipulator having at least a communicating portion, a propulsion portion for driving said orbital space worker itself and a drive for driving said manipulator.

10. A spacecraft system according to claim 4, wherein said mission object comprises a solar power generator having a photosensitive portion for receiving solar energy, a power transmitting portion for transmitting electric power from said photosensitive portion to the ground, and a structure for mounting said photosensitive portion and said power transmitting portion thereon.

11. A spacecraft system according to claim 4, wherein said mission object comprises a structure, apparatus and materials to be used as space laboratory equipment in an unmanned space laboratory base.

12. A spacecraft system according to claim 8, wherein said mission object houses at least a portion of said units comprising said mission means, including said orbital space worker, said communication unit, said direction control unit, said propulsion unit and said data processing unit after some of said plurality of units comprising said mission means are separated from said spacecrafts.

13. A spacecraft system according to claim 12, wherein said orbital space worker is produced by interchangeably connecting said plurality of units comprising said mission object.

14. A spacecraft system according to claim 1, wherein said mission object further includes old spacecrafts which no longer serve a functional purpose.

15. A spacecraft system according to claim 1, wherein said central control means comprises a ground control station.

16. A spacecraft system according to claim 1, wherein said central control means comprises a space control station.

17. A spacecraft system according to claim 13, wherein said orbital space worker is used for interchangeably connecting at least a command unit, a power generation unit, a structure unit, a material store house, a propellent depot unit, an extension power supply unit, a direction control unit, a propulsion unit and a data processing unit which are separated from said spacecrafts in accordance with a command from said central control means and said spacecrafts.

18. A spacecraft system according to claim 13, wherein said orbital space worker is used for interchangeably connecting at least a communication unit, an attitude control unit, a propulsion unit and a data processing unit with said mission object.

19. A spacecraft system according to claim 13, wherein said orbital space worker is used for assembling said mission object in cooperation with other orbital space workers of spacecrafts according to a command from said spacecraft in which said orbital space worker is housed.

20. A spacecraft system according to claim 2, wherein said central control means comprises a ground control station.

21. A spacecraft system according to claim 2, wherein said mission object includes construction materials, electric materials, mechanical materials, chemical materials, waste products, subsistence goods, and research materials.

22. A spacecraft system according to claim 2, wherein said spacecrafts include an orbital space worker.

23. A spacecraft system according to claim 2, wherein said mission object further includes old spacecrafts which no longer serve a functional purpose.

24. A spacecraft system according to claim 2, wherein said mission means comprises a plurality of units which are provided for respective operation functions and can be separated from said spacecrafts, therefore said mission means can be formed of various types of operation functions.

25. A spacecraft system according to claim 24, wherein said plurality of units are interchangeably connected and include at least a command unit, a power generation unit, a structure unit, an orbital space worker, a communication unit, a direction control unit, a propulsion unit, a data processing unit, a material storehouse, a propellent unit depot and an extension power supply unit.

26. A spacecraft system according to claim 22, wherein said orbital space worker comprises a manipulator having at least a communicating portion, a propulsion portion for driving said orbital space worker itself and a drive for driving said manipulator.

27. A spacecraft system according to claim 21, wherein said mission object comprises a solar power generator having a photosensitive portion for receiving solar energy, a power transmitting portion for transmitting electric power from said photosensitive portion to the ground, and a structure for mounting said photosensitive portion and said power transmitting portion thereon.

28. A spacecraft system according to claim 21, wherein said mission object comprises a structure, apparatus and materials to be used as space laboratory equipment in an unmanned space laboratory base.

29. A spacecraft system according to claim 25, wherein said mission object houses at least a portion of said units comprising said mission means, including said orbital space worker, said communication unit, said direction control unit, said propulsion unit and said data processing unit after some of said plurality of units comprising said mission means are separated from said spacecrafts.

30. A spacecraft system according to claim 29, wherein said orbital space worker is produced by interchangeably connecting said plurality of units comprising said mission object.

31. A spacecraft system according to claim 30, wherein said orbital space worker is used for interchangeably connecting at least a communication unit, an attitude control unit, a propulsion unit and a data processing unit with said mission object.

32. A spacecraft system according to claim 30, wherein said orbital space worker is used for assembling said mission object in cooperation with other orbital space workers of spacecrafts according to a command from said spacecraft in which said orbital space worker is housed.

33. A spacecraft system according to claim 2, wherein said central control means comprises a space control station.

34. A spacecraft system according to claim 30, wherein said orbital space worker is used for interchangeably connecting at least a command unit, a power generation unit, a structure unit, a material store house, a propellent depot unit, an extension power supply unit, a direction control unit, a propulsion unit and a data processing unit which are separated from said spacecrafts in accordance with a command from said central control means and said spacecrafts.

* * * * *